United States Patent
Hammes et al.

(10) Patent No.: US 11,108,163 B2
(45) Date of Patent: Aug. 31, 2021

(54) NARROWBAND LEAKY WAVE ANTENNA FOR SENSING OBJECTS IN RELATION TO A VEHICLE

(71) Applicant: IEE INTERNATIONAL ELECTRONICS & ENGINEERING S.A., Echternach (LU)

(72) Inventors: Christian Hammes, Trier (DE); Andreas Diewald, Kell am See (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 316 days.

(21) Appl. No.: 16/069,906

(22) PCT Filed: Jan. 13, 2017

(86) PCT No.: PCT/EP2017/050681
§ 371 (c)(1),
(2) Date: Jul. 13, 2018

(87) PCT Pub. No.: WO2017/121857
PCT Pub. Date: Jul. 20, 2017

(65) Prior Publication Data
US 2019/0020116 A1 Jan. 17, 2019

(30) Foreign Application Priority Data
Jan. 14, 2016 (LU) .......................................... 92947

(51) Int. Cl.
*G01S 13/04* (2006.01)
*H01Q 13/20* (2006.01)
(Continued)

(52) U.S. Cl.
CPC .............. *H01Q 13/206* (2013.01); *G01S 7/35* (2013.01); *G01S 13/04* (2013.01); *H01Q 9/0428* (2013.01);
(Continued)

(58) Field of Classification Search
CPC ......... G01S 13/04; G01S 7/35; H01Q 13/206; H01Q 21/065; H01Q 9/0428; H01Q 9/0464
See application file for complete search history.

(56) References Cited

U.S. PATENT DOCUMENTS 3,987,455 A 10/1976 Olyphant, Jr.
5,163,176 A * 11/1992 Flumerfelt ............ G01S 7/2813
342/174

(Continued)

FOREIGN PATENT DOCUMENTS

| CN | 102361167 A | 2/2012 |
| CN | 204732538 U | 10/2015 |
| FR | 2703516 A1 | 10/1994 |

OTHER PUBLICATIONS

Chinese Office Action and Search Report with English translation corresponding to Chinese Patent Application No. 201780014572.7, dated Nov. 29, 2019, 15 pages.

(Continued)

*Primary Examiner* — Timothy A Brainard
(74) *Attorney, Agent, or Firm* — Reising Ethington P.C.

(57) ABSTRACT

A periodic type leaky wave antenna, formed, e.g. on a printed circuit board, using cells of a filled circular structure. The leaky wave antenna may be formed in a series fed patch configuration. In order to achieve a high quality factor with respect to high frequency sensitive beam, a circular patch structure may be used, giving the best area to perimeter ratio. The cavity model based design considerations yield a proportional Q-factor expression with respect to the geometrical (Continued)

ratio. The antenna design takes into consideration effects such as degradation at broadside and circular polarisation, as well as input reflection coefficient. The tuning of a delay loop length yields a simple optimization criterion in order to achieve Q-balancing, circular polarisation and a matched configuration.

23 Claims, 19 Drawing Sheets

(51) Int. Cl.
    *H01Q 9/04* (2006.01)
    *G01S 7/35* (2006.01)
    *H01Q 21/06* (2006.01)
(52) U.S. Cl.
    CPC ......... *H01Q 9/0464* (2013.01); *H01Q 21/065* (2013.01)

(56) References Cited

U.S. PATENT DOCUMENTS

| | | | | |
|---|---|---|---|---|
| 5,581,267 | A * | 12/1996 | Matsui | H01Q 19/10 343/753 |
| 2005/0082003 | A1* | 4/2005 | Ishii | H01P 1/173 156/345.41 |
| 2005/0192727 | A1* | 9/2005 | Shostak | B60C 23/041 701/37 |
| 2007/0238412 | A1* | 10/2007 | Williams | H01Q 13/02 455/41.2 |
| 2007/0285314 | A1* | 12/2007 | Mortazawi | H01Q 1/3233 342/375 |
| 2012/0169527 | A1* | 7/2012 | Edvardsson | G01F 23/284 342/124 |
| 2014/0333502 | A1 | 11/2014 | Uno et al. | |

OTHER PUBLICATIONS

L. Teng, "Theoretical Research and Engineering Design on Microstrip Antennas", Chinese Excellent Master's Thesis Full Text Database, No. 12, dated Dec. 15, 2011, pp. 43-50.
International Search Report on International application No. PCT/EP2017/050681, dated Jan. 13, 2017, 4 pages.
Written Opinion for International application No. PCT/EP2017/050681, dated Jan. 13, 2017, 8 pages.
Juhua Liu et al., Design and Analysis of a Low-Profile and Broadband Microstrip Monopolar Patch Antenna, IEEE Transactions on Antennas and Propagation, IEEE Serevice Center, Piscataway, NJ, US., vol. 61, No. 1, Jan. 1, 2013, pp. 11-18.
Bacarelli, Paolo, One-Dimensional Periodic Leaky-Wave Antennas, La Spienza University of Rome, 57 pages.
Otto, Simon et al., Transmission Line Modeling and Asymptotic Formulas for Periodic Leaky-Wave Antennas Scanning Through Broadside, IEEE Transactions on Antennas and Propagation, vol. 59, No. 10, Oct. 2011, 15 pages.
Valerio, Guido et al., Accurate Bloch-Wave Analysis of 1-D Periodic Lines Through the Simulation of Truncated Structures, La Spienza University of Rome, vol. 59, No. 6, Jun. 2011, 8 pages.
Otfried, Georg., Elektromagnetische Wellen, Springer, 1997, 336 pages.
Paulotto, Simone et al., Full-Wave Modal Dispersion Analysis and Broadside Optimization for a Class of Microstrip CRLH Leaky-Wave Antennas, IEEE Transactions on Microwave Theory and Techniques, vol. 59, No. 12, Dec. 2008, 12 pages.
Paulotto, Simone et al., a Novel Technique for Open-Stopband Suppression in 1-D Periodic Printed Leaky-Wave Antennas, IEEE Transactions on Antennas and Propagation, vol. 57, No. 7, Jul. 2009, 13 pages.
Prof. Dr.-Ing. W. Wiesbeck, Antennen und Antennensysteme, Universitat Karlsruhe (TH) Institut far Höchstfrequenztechnik und Elektronik, 2005, 228 pages.
Otto, Simon et al., Q-Balancing in Periodic Leaky-Wave Antennas to mitigate Broadside Radiation Issues, Department HFT & ATE, University of Duisburg-Essen, Bismarckstr. 81, 47057 Duisburg, Germany Ecole Polytechnique de Montreal, 2500, ch. de Polytechnique, H3T 1J4, Montreal, Quebec, Canada, 4 pages.
A. Anghel et al., Improved Composite Right/Left-Handed Cell for Leaky-Wave Antenna, Progress in Electromagnetics Research Letters, vol. 22, 59-69, 2011. Faculty of Electronics, Telecommunications and Information Technology University POLITEHNICA of Bucharest 1-3 liliu Maniu. Bucharest 061071, Romania, 11 pages.
Balanis, Constantine, Antenna Theory and Analysis Design, Third Edition, 2005, pp. 549-609.
Otto, Simon et al., An Energy-Based Circuit Parameter Extraction Method for CRLH Leaky Wave Antennas, University of Duisburg-Essen, Bismarck-Strafle 81, 47057 Duisburg, Germany, 5 pages.
Otto, Simon et al., Circular Polarization of Periodic Leaky-Wave Antennas With Axial Asymmetry: Theoretical Proof and Experimental Demonstration, IEEE Transactions on Antennas and Propagation, vol. 62, No. 4, Apr. 2014, 13 pages.
European Office Action corresponding to European Application No. 17 700 369.6, dated May 25, 2021, 8 pages.

* cited by examiner e-field(f=24.25)[1](peak)
Component: Normal
Orientation: Inside
3D Maximum [V/m]: 80.39e+03
Frequency: 24.25
Phase: 15 e-field(f=24.25)[1](peak)
Component: Normal
Orientation: Inside
3D Maximum [V/m]: 80.39e+03
Frequency: 24.25
Phase: 105

Frequency=24.25
Main lobe magnitude=14dB
Main lobe direction=0.0 deg.
Angular width(3dB)=3.8 deg.
Side lobe level=-15.8dB e-field(f=24.25)[1](peak)
Component: Normal
Orientation: Inside
3D Maximum [V/m]: 76.22e+03
Frequency: 24
Phase: 105

NARROWBAND LEAKY WAVE ANTENNA FOR SENSING OBJECTS IN RELATION TO A VEHICLE

TECHNICAL FIELD

The present invention generally relates to the technical field of sensing objects internal or external to a vehicle, and more particularly to a narrowband leaky wave antenna with large beamsweep for radar sensing in relation to a vehicle.

BACKGROUND OF THE INVENTION

It is known to provide for contactless sensing (e.g. of humans) within a vehicle, e.g. for occupancy detection (OD), occupancy classification (OC) or seatbelt reminder (SBR) functionality. Radar technology offers some advantages in comparison to other occupancy detection and classification methods. It is a contactless and invisible measurement system which can easily be integrated behind plastic covers and textiles. Radar systems can measure the smallest motions—within the range of micrometers, e.g. using microwaves.

The radar system uses an antenna with frequency dependent radiation directions (e.g. a kind of a leaky wave antenna or meta material antenna), so the antenna can sense into different directions. By observing the motion in the pure CW signal the angle of motion maximum can be determined. By use of an advanced autocalibration method the motion can be extracted and classified. This allows to distinguish between objects with arbitrary motions (due to driving situations) and humans/animals inhering a breathing motion of the chest. By scanning over the surface of the human/animal and interpreting the reflected motion signal the size of the human can be estimated which allows a classification.

Leaky wave antennas are discussed in the literature, for example (a) Klaus Solbach Simon Otto, Andreas Rennings and Christophe Caloz. Transmission Line Modeling and Asymptotic Formulas for Periodic Leaky-Wave Antennas Scanning Through Broadside. IEEE TRANSACTIONS ON ANTENNAS AND PROPAGATION, (b) Fabrizio Frezza Simone Paulotto, Paolo Baccarelli and David R. Jackson. Full-Wave Modal Dispersion Analysis and Broadside Optimization for a Class of Microstrip CRLH Leaky-Wave Antennas. IEEE TRANSACTIONS ON MICROWAVE THEORY AND TECH-NIQUES, 2008, (c) Fabrizio Frezza Simone Paulotto, Paolo Baccarelli and David R. Jackson. A Novel Technique for Open-Stopband Suppression in 1-D Periodic Printed Leaky-Wave Antennas. IEEE TRANSACTIONS ON ANTENNAS AND PROPAGATION, 2009, (d) Zhichao Chen Andreas Rennings Klaus Solbach Simon Otto, Amar Al-Bassam and Christophe Caloz. Q-Balancing in Periodic Leaky-Wave Antennas to mitigate Broadside Radiation Issues. Department HFT ATE, University of Duisburg-Essen, Bismarckstr. 81, 47057 Duisburg, Germany Ecole Polytechnique de Montreal, 2500, ch. de Polytechnique, H3T 1J4, Montreal, Quebec, Canada, (e) T. Liebig C. Caloz K. Solbach S. Otto, A. Rennings. An Energy-Based Circuit Parameter Extraction Method for CRLH Leaky Wave Antennas. Hochfrequenztechnik (HFT) and Allgemeine und Theoretische Elektrotechnik (ATE) University of Duisburg-Essen, Ecole Polytechnique de Montreal, ch. de Polytechnique, H3T 1J4, Quebec, Canada, and (f) Amar Al-Bassam Andreas Rennings Klaus Solbach Simon Otto, Zhichao Chen and Christophe Caloz. Circular Polarization of Pe-riodic Leaky-Wave Antennas With Axial Asymmetry: Theoretical Proof and Experimental Demonstration. IEEE TRANSACTIONS ON ANTENNAS AND PROPAGATION.

JUHUA LIU ET AL: "Design and Analysis of a Low-Profile and Broadband Microstrip Monopolar Patch Antenna", IEEE TRANSACTIONS ON ANTENNAS AND PROPAGATION, IEEE SERVICE CENTER, PISCATAWAY, N.J., US, vol. 61, no. 1, 1 Jan. 2013 (2013-01-01), pages 11-18, XP011484563, ISSN: 0018-926X, discloses a microstrip monopolar patch antenna with a wide bandwidth and a monopole like radiation pattern. Such antenna is constructed as a circular patch (disc-shaped) antenna of radius R. The antenna is shorted concentrically with a set of (e.g. 19) conductive vias at positioned at radius a, connecting opposing surfaces of the circular patch. In examples, R=28 mm, a=31.44 mm and the radius of a via is 0.5 mm. The antenna can operate as a broadband monopolar patch antenna that utilizes two modes (TM01 and TM02 modes).

U.S. Pat. No. 3,987,455A discloses a microstrip antenna having one or more arrays of resonant dipole radiator elements. The radiator elements have an E coordinate dimension of approximately $\lambda_0/2\sqrt{\varepsilon_r\mu_r}$. In embodiments, the radiator elements have filled elliptical form. Bridge elements directly and conductively join adjacent pairs of radiator elements to provide energy distribution and the desired phase relationship, and the bridge elements can form a zig-zag pattern. Two capacitative tabs and are attached to a central radiator element, and the antenna is fed by an unbalanced coaxial transmission line, the center conductor of which contacts a terminal on the central radiator element, so as to be able to drive the radiator elements on both sides of central radiator element in phase while utilizing element as both a phase reversing element and a radiator element. In an embodiment, the elliptical radiator elements each have an E coordinate dimension of 1.52 cm, an H coordinate dimension of 2.03 cm and are located on 2.54 cm centers.

A problem is that currently known leaky wave antenna systems are designed by Q-balancing method and an asymmetric approach in order to achieve circular polarization. Frequency sensitive beams and simultaneously small beams are rarely catered for, if at all. An issue is that common optimization methods employ only the Q-balancing condition and not all necessary parameters like mutual coupling, input reflection coefficient, axial ratio and open stopband suppression.

Object of the Invention

It is an object of the present invention to address the aforementioned issues and provide an improved antenna. This object is achieved by the invention as claimed in claims 1, 7 and 14 of the appended claims.

GENERAL DESCRIPTION OF THE INVENTION

In order to reach a high propagation constant shift over frequency, the Q-factor of the patches employed needs to be as high as possible. Thus, a circular patch or cell may be used as radiating element, as the ratio between circumference and the area is best for circles. The E01 mode may be used for radiation. This mode is excited by the feeding network. The patch antenna may be used itself to rotate the field and shift the phase for the next unit cell.

According to one aspect of the invention there is provided an antenna element comprising a cell of filled circular geometry adapted to operate, when driven in use, in the E01 mode.

The antenna element may further include a stub configuration adapted to achieve a matched network using a mode rotation condition, wherein said cell is coupled to a feed line at a first point on a perimeter of the cell such that the feed line extends tangentially to the cell.

The antenna element may further include a delay loop configured for mode rotation. The delay loop may be adapted to achieve Q-balancing, mutual coupling compensation and/or tuning the reflection coefficient as well as an axial ratio close to one within the delay loop length.

Preferably, the antenna element is configured to be coupled to a feed line at a first point on a perimeter of the cell, and the delay loop is attached to a side of the cell at points on the perimeter substantially opposite to the side containing the first point. Preferably, a y-direction is defined by or parallel to a line joining the center of the cell with said first point, and a line through said center and perpendicular to the plane of the cell defines an x-direction; and wherein the delay loop is symmetrical in the x-y plane. Preferably, a z-direction is defined through said center and perpendicular to the x-y plane.

The antenna element may be in a form allowing the first spatial mode in z-direction to radiate.

The antenna element may further comprise a passive spatial mode filter. In one embodiment, the passive spatial mode filter comprises the delay loop with integrated delay lines. In one embodiment, the passive spatial mode filter comprises an upper half circle and a lower half circle, with a respective delay line coupling each pair of opposing ends of the upper half circle and a lower half circle. Preferably, the separation d between the centres of the lower half circle and the cell is given by $d=\sqrt{2}r_0$ where $r_0$ is the radius of the upper half circle and/or the lower half circle and/or the cell.

According to another aspect of the invention there is provided a unit cell comprising a cell as substantially disclosed herein above, a delay loop and a feed line portion, the feed line portion being an element of the feed line.

In one embodiment, the parameters of the unit cell are given by the right hand column of Table 4.1 hereinbelow.

According to another aspect of the invention there is provided a leaky wave antenna comprising a plurality of antenna elements or a plurality of unit cells as disclosed above.

The antenna elements may be connected to each other in a linear array, so as to form a series fed patch antenna.

The leaky wave antenna may be of periodic form.

The antenna elements are preferably connected to a feed line.

The passive spatial mode filter may comprise a filter loop attached at points on a side of the cell opposite to the point of connection of the cell to the feed line.

Preferably, a phase shift within each unit cell is $2\pi n$ where n is an integer.

In one embodiment, the parameters of the leaky wave antenna are given by the right hand column of Table 4.2 hereinbelow.

The leaky wave antenna may be manufactured using microstrip technology on a printed circuit board (PCB).

According to another aspect of the invention there is provided a radar sensor system for sensing occupancy status within an automotive vehicle, the system comprising:
an antenna system, for illuminating at least one occupiable position within the vehicle with continuous wave (CW signals), the CW signals being frequency modulated in time, the antenna system comprising a leaky wave antenna as disclosed above;
at least one sensor for receiving at least one sensor signal reflected as a result of the CW signals,
processing circuitry, coupled to the at least one sensor, the processing circuitry being operable for applying, occupancy detection algorithms to the at least one sensor signal to generate a modified signal; and generating, based on the modified signals, one or more occupancy status signals, the occupancy status signal indicating a property related to said at least one occupiable position.

The antenna system may be adapted to illuminate with a steerable beam from −45° to 45° and/or a steerable beam from −5° to 5° in the 24 GHz ISM Band.

In embodiments, a large beamsweep over the frequency is provided, as well as a small beam, in order to achieve high angle resolution. Small beams are possible as the structure is elongate. Therefore, a series fed patch leaky wave antenna is preferably employed. This type of antenna is less beam sensitive compared to a meta-material approach. A high quality factor affects a more frequency sensitive beam. Therefore, a round/circular patch geometry is used, which also affords good axial ratio properties with respect to circular polarisation. Within the delay loop and the circular patch stub configuration, the reflection coefficient, axial ratio, mutual coupling effects and open stopband suppression can be done by tuning just one parameter.

In embodiments, the radar sensor system is provided for in-vehicle occupant detection and classification (e.g. airbag suppression), for passenger presence detection, for passenger's vital sign monitoring and/or for seatbelt reminder functionality (SBR). In embodiments, the system includes an antenna system which illuminates one or more seats of an automotive vehicle.

Advantages of the invention, at least in embodiments, include:
only one sensor is necessary for the whole rear bench of an automobile (one single RF channel with I/Q output);
only one sensor is needed for the whole car if interferometry is possible (two single RF channels with I/Q output on one PCB);
excellent cost efficiency related to integration and material costs (also in comparison to conventional radar systems); and/or
vital sign monitoring as an additional functionality, without further complexity.

BRIEF DESCRIPTION OF THE DRAWINGS

Further details and advantages of the present invention will be apparent from the following detailed description of not limiting embodiments with reference to the attached drawing, wherein.

DESCRIPTION OF PREFERRED EMBODIMENTS

In the following, like numerals will be used to indicate like elements. Details of the nomenclature used herein is given in Annex A at the end of this disclosure. A Bibliography of documents referred to herein is given in Annex B at the end of this disclosure.

The present embodiments are discussed in relation to automobile interior radar sensing using the antenna element according to the invention. (Exterior sensing techniques are known and are discussed elsewhere.) Radar sensing within a complex environment like the interior of a car cabin is very challenging and the algorithm differs much from those for exterior radar sensing.

The advantage of radar systems is that in contrast to passive camera systems the radar system operates also in the night as it illuminates actively the scene. Active camera systems need an illumination in the light spectrum which can be visible for the human eye (compare to the glooming of infrared cameras). Radar systems work in the microwave range which is completely invisible for the human eye. In addition it penetrates into materials and can transmit through. So the integration behind plastic covers and textiles as well is possible while camera based systems need an opening to look through.

FIG. 1 is a schematic diagram of sensor positions within a passenger compartment of a vehicle for an embodiment of the invention. The position of sensor installation is preferably in front of the occupant, so that the whole area of the body or a part of it is illuminated. Possible integration places can be between top ceiling and car body, in the car body pillars, center console, overhead console, dash boards, steering wheel etc.

Figure 1A:
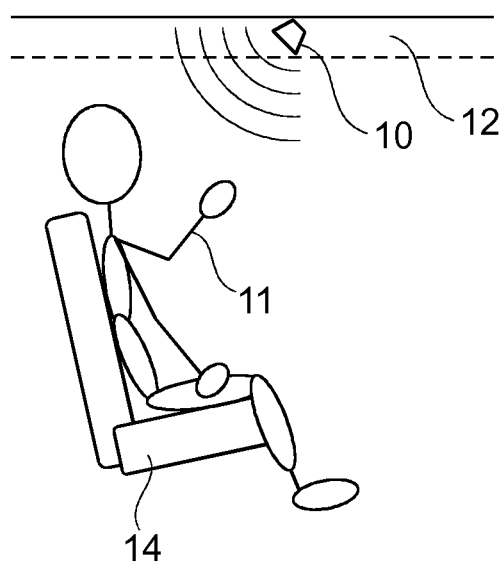
FIG. 1 is a schematic diagram of sensor positions within a passenger compartment of a vehicle for an embodiment of the invention.
Figure 1B:
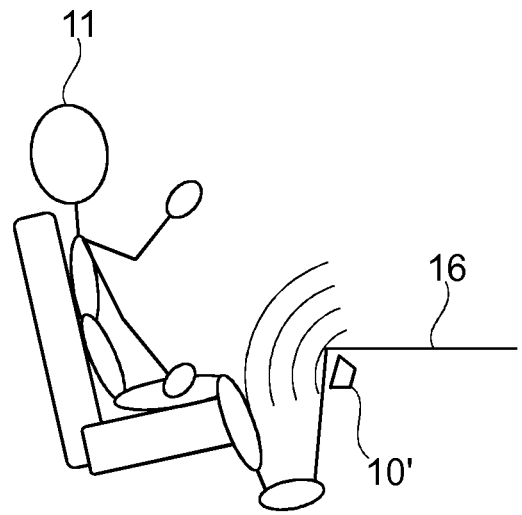

FIG. 1(a) shows a radar sensor 10 built into the ceiling 12 of a vehicle. The sensor 10 includes at least one antenna (not shown) for illuminating one, two or three of the (occupiable) seating positions on the rear bench 14 of the vehicle, for detecting the presence of one or more occupants 11. FIG. 1b shows a radar sensor 10' for sensing occupancy in the front of the vehicle. In this case, the sensor 10' is built into front console 16, and includes at least one antenna (not shown) for illuminating one or both of the front seats of the vehicle.

In each case, the sensor 10, 10' may additionally include transmit-receive electronics and processing circuitry for carrying out the occupancy detection operations as discussed herein below, or the latter may be coupled to the antenna in sensor 10, 10', but located elsewhere within the vehicle.

Embodiments of the invention will be discussed in the following.

1. Introduction

Embodiments of the invention relate to leaky wave antennas. The advantage of leaky wave antennas is their frequency steerable radiation beam capability. Embodiments of the invention relate to two leaky wave antennas—one with a steerable beam from −45° to 45° and the other from −5° to 5° in the 24 GHz ISM Band. Embodiments of the invention utilize the whole frequency band for the given angle range. Embodiments of the invention are manufactured with printed circuit board technology. Embodiments of the invention comprise periodic leaky wave antennas are investigated.

Embodiments of the invention relate to leaky wave antennas which are used for interior automotive applications with reduced cost. Embodiments of the invention relate to the use of three antennas in order to achieve a separation of three persons on the rear bench. Because of the beam steering capability of leaky wave antennas with their narrow beam, embodiments of the invention relate to should render it easier to distinguish multiple persons as well as reduction in the number of sensors from three to one.

2. Theory of Leaky Wave Antennas

The concept of leaky wave antennas is to transform a three dimensional radiation problem into a two or especially one dimensional problem in the case of periodicity. The radiating mode named leaky mode is a derivation from the dispersion relation. Therefore the distinction of leaky modes and wave propagation requires discussion.

2.1 Wave Propagation and Leaky Modes

A leaky mode is a radiative power leakage from the major mode. If there are several modes which are able to propagate and it is assumed that the influence of the excitation is neglected, the utilization of the vectorial Helmholtz equation is necessary.

$$\Delta \vec{A} - k_0^2 \vec{A} = 0 \tag{2.1}$$

The vector $\vec{A}$ represents an arbitrary field vector and $k_0$ represents the free space propagation constant. For simplicity, the derivation in y-direction is set to zero $$\frac{\partial}{\partial y} = 0.$$

The spatial Fourier transform of equation 2.1 yields $$(-\underline{k}_x^2 - \underline{k}_z^2 + k_0^2)\underline{\vec{A}} = 0 \tag{2.2}$$

The non-trivial solution of equation 2.2 is the dispersion relation.

$$\underline{k}_x^2 + \underline{k}_z^2 = k_0^2 \tag{2.3}$$

Figure 47:
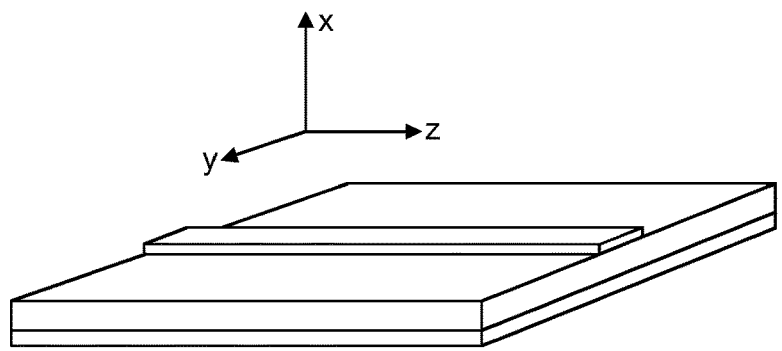
FIG. 47 shows a coordinate system definition according to known leaky wave antenna technology.

Because of the manufacture in microstrip technology a bounded wave appears and transmission line theory considerations are valid. FIG. 47 shows a coordinate system definition: as implied in FIG. 47, the z-direction is the propagation along the transmission line and the x-direction is the radiation at broadside.

The radiation condition for the lossless case can be derived from the dispersion relation [1].

$$\underline{k}_x = \sqrt{k_0^2 - k_z^2} = \begin{cases} j\alpha_x & \text{for } k_z \geq k_0 \\ \beta_x & \text{for } k_z \leq k_0 \end{cases} \tag{2.4}$$

Figure 48:
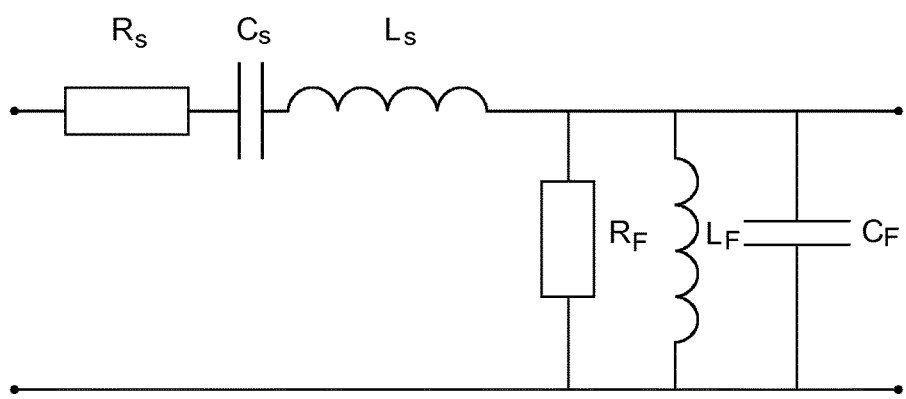
FIG. 48 shows a unit cell leaky wave transmission line model according to known leaky wave antenna technology.

Equation 2.4 is the leakage condition and can be used for design considerations. In order to achieve the radiation condition, it is necessary to quantize the propagation constant $\underline{k}_z$. From transmission line theory it is well known that the propagation constant for the lossless case is a function of both the capacitance and the inductance per unit length for an infinitesimal small unit cell. The unit cell approach results in a universal leaky wave matched transmission line model [2]. FIG. 48 shows a unit cell leaky wave transmission line model. The aim is to determine these lumped elements as well as the length of the unit cell.

2.2 Unit Cell Design Approach

It is not possible to design an infinitesimal small unit cell. But it possible to design an artificial unit cell. The condition for an infinitesimally small unit cell is that the phase shift between the input and output port is zero, also called modelling around broadside [2]. At this point, the transmission line guided a quasi standing wave.

2.2.1 Bloch Wave Analysis

The bloch wave analysis uses the periodicity along the z-direction. This means that every unit cell's input and output are connected to the same unit cell. The interconnection between an infinite number of unit cells yields to a spatial harmonic in the z-direction. The theory of infinite periodic structures is based on Floquet's theorem [1]. The electric field's longitudinal periodicity can be express as follows [1]:

$$\vec{E}(x, z+p) = e^{-jk_z(p)}\vec{E}(x,z) \tag{2.5}$$

The associated electric field distribution within each unit cell is equal. Furthermore, the guided wave condition yields to the Bloch Wave form.

$$\vec{E}(x,z) = e^{-jk_{z0}}\vec{E}_p(x,z) \tag{2.6}$$

The periodic electric field $\vec{E}_p(x, z)$ can be expanded in a spatial Fourier series within the z-direction.

$$\vec{E}_p(x, z) = \sum_{n=-\infty}^{\infty} \vec{\tilde{E}}_{p_n}(x) e^{-jn\frac{2\pi}{p}z} \tag{2.7}$$

The combination of equation 2.6 and 2.7 results to a Fourier transformed Bloch Wave. Within the periodicity, it is possible to express a normal mode in an infinite number of spatial harmonics. Each spatial harmonic has the general propagation constant for integers of n:

$$k_{zn} = \beta_{z0} + n\frac{2\pi}{p} - j\alpha_z \quad (2.8)$$

Equation 2.8 implicates that if just the spatial harmonic n=−1 at a certain frequency propagates, a standing wave is observable. If only this mode propagates, the unit cell can be approximated by a simple transmission line model which is a linearised version of the distributed structure within the centre frequency $\omega_0$. When considering an arbitrary distributed structure which is designed for the propagation of the n=−1 spatial harmonic, a common chain parameter network model is valid [2]. The Bloch Wave analysis for transmission line models extracts common transmission line parameters from the chain parameter matrix.

Figure 49:
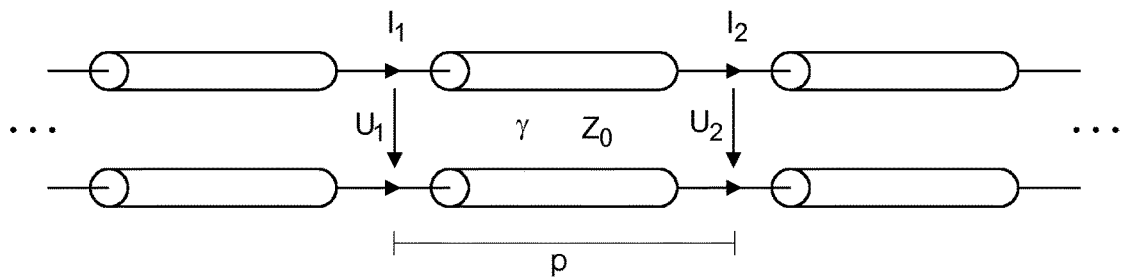
FIG. 49 shows the Bloch wave transmission line model according to known leaky wave antenna technology.

FIG. 49 shows the Bloch wave transmission line model.

If there is a simple transmission line approach the eigen-decomposition of the corresponding chain parameter matrix yields to [3].

$$\lambda_1 = e^{-\gamma_z p} \quad (2.9)$$

$$\lambda_2 = e^{+\gamma_z p} \quad (2.10)$$

This result is the same as in Floquet's theorem. The trace of the chain parameter matrix results in the dispersion relation:

$$\cosh(\gamma_z p) = \frac{A_{11} + A_{22}}{2} \quad (2.11)$$

The Bloch impedance can be determined by the following equation.

$$Z_B = \frac{-2A_{12}}{A_{11} - A_{22} \mp \sqrt{(A_{11} + A_{22})^2 - 4}} \quad (2.12)$$

The minus/plus operator in the denominator denotes on which port the Bloch impedance is calculated. It depends on the direction of counter arrows on the ports.

2.2.2 Linearisation and Lattice Model

With respect to the model in FIG. 48, it is difficult to acquire a right modelling. The reason for this lies in the fact that in transmission line theory the series impedance belongs to an infinitesimal current, the voltage is zero and the shunt admittance belongs to a infinitesimal voltage and the current is zero. This relationship is comparable with the derivation of the telegraph equation for voltages and currents and their behaviour to the lumped elements per unit length [4].

$$-\frac{\partial}{\partial z}U = (R' + j\omega L')I \quad (2.13)$$

$$-\frac{\partial}{\partial z}I = (G' + j\omega C')U \quad (2.14)$$

Figure 50:
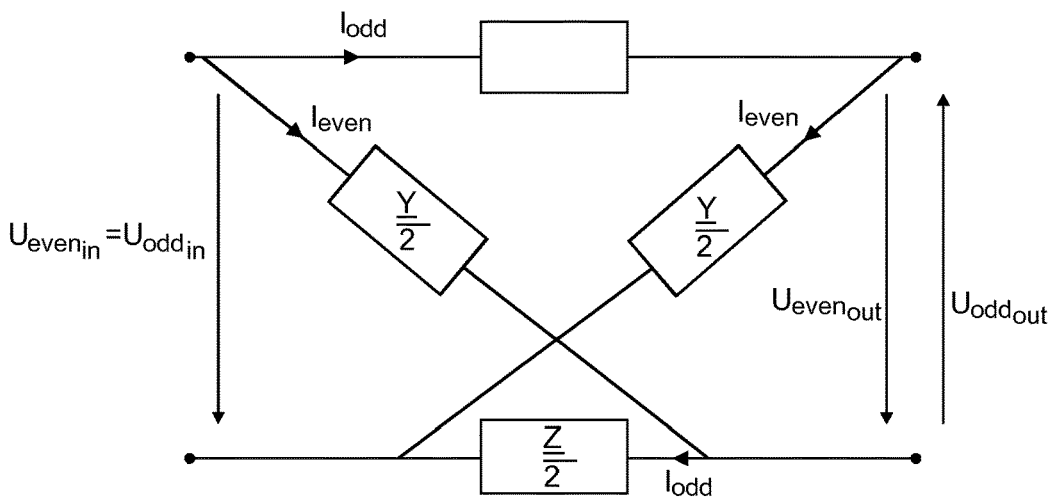
FIG. 50 shows a unit cell lattice model according to known leaky wave antenna technology.

Finite structures affect an odd excitation for the series resistance and an even excitation for the for the shunt admittance. Using a lattice model solves the problem of decoupling series impedance $Z_s$ and the shunt admittance $Y_p$ [2]. FIG. 50 shows a unit cell lattice model.

Commonly, network transformation techniques results to the chain parameter matrix. Moreover, the chain parameter are inserted in equation 2.11 and 2.12 [2].

$$\cosh(\gamma_z p) = \frac{4 + \underline{Z}_s \underline{Y}_p}{4 - \underline{Z}_s \underline{Y}_p} \quad (2.15)$$

$$Z_B = \sqrt{\frac{\underline{Z}_s}{\underline{Y}_p}} \quad (2.16)$$

Whereas the series impedance $\underline{Z}_s$ and the shunt admittance $\underline{Y}_p$ are defined as:

$$\underline{Z}_s = R_s + j\omega L_s + \frac{1}{j\omega C_s} \quad (2.17)$$

$$\underline{Y}_p = G_p + j\omega C_p + \frac{1}{j\omega L_p} \quad (2.18)$$

So far, no condition for a standing wave has been met. If the shunt admittance and the series impedance are in resonance, then their imaginary part is zero and no phase shift appears. Furthermore, the standing wave condition should be the operating point at the centre frequency $\omega_0$. Hence, it is necessary that the resonance frequencies are equal to the centre frequency. This restriction yields to the open stopband suppression [5]. The open stopband effect is redescribed in his own section. For reasons of generality, the Lattice model is linearised at each resonant frequency. The linearised model should be similar with a common transmission line model. So that the series impedance has the lumped elements R and L and the shunt admittance has the lumped elements G and C [2].

$$\text{Im}\{\underline{Z}_s\}|_{\omega=\omega_s} = 0 \Leftrightarrow C_s = \frac{1}{\omega_s^2 L_s} \quad (2.19)$$

$$\text{Im}\{\underline{Y}_p\}|_{\omega=\omega_p} = 0 \Leftrightarrow L_p = \frac{1}{\omega_p^2 C_p} \quad (2.20)$$

$$R = \text{Re}\{\underline{Z}_s\}|_{\omega=\omega_s} = R_s \quad (2.21)$$

$$G = \text{Re}\{\underline{Y}_p\}|_{\omega=\omega_p} = G_p \quad (2.22)$$

The real part of each equation is still linear. Now, the imaginary part can be linearised using the condition 2.19 and 2.20, respectively.

$$\omega L = \text{Im}\{\underline{Z}_{sl}\} = \frac{\partial}{\partial \omega}\text{Im}\{\underline{Z}_s\}|_{\omega=\omega_s}(\omega - \omega_s) = 2L_s(\omega - \omega_s) \quad (2.23)$$

$$\omega C = \text{Im}\{\underline{Y}_{pl}\} = \frac{\partial}{\partial \omega}\text{Im}\{\underline{Y}_p\}|_{\omega=\omega_s}(\omega - \omega_p) = 2C_p(\omega - \omega_p) \quad (2.24)$$

Hence, the linear admittance $\underline{Y}_{pl}$ and impedance $\underline{Z}_{sl}$ are $$\underline{Z}_{sl} = R_s + j2L_s(\omega - \omega_s) \quad (2.25)$$

$$\underline{Y}_{pl} = G_s + j2C_p(\omega - \omega_p) \quad (2.26)$$

The dispersion relation and the Bloch impedance are the linearised case which is very similar with respect to the common transmission line theory as depicted in FIG. 49.

$$\gamma_{z1} = \frac{\sqrt{Z_{sl}Y_{pl}}}{p} \quad (2.27)$$

$$Z_B = \sqrt{\frac{Z_{sl}}{Y_{pl}}} \quad (2.28)$$

2.2.3 Dispersion Diagram and Radiation Properties

The Dispersion diagram is the visualisation of the dispersion relation. Usually the propagation constant is even the abscissa and the frequency is the ordinate. Considering the lossless case, the propagation constant yields to be complex in a certain frequency band.

$$\underline{\gamma}_z = \alpha_z + j\beta_z = j\frac{2}{p}\sqrt{L_s C_p}\sqrt{(\omega - \omega_s)(\omega - \omega_p)} \quad (2.29)$$

The aforementioned frequency band is $\omega_s \leq \omega \leq \omega_p$ or $\omega_s \geq \omega \geq \omega_p$, respectively. This attenuation in the given frequency band is called open stopband. The effect is physically justified in standing wave phenomena beyond the centre frequency. Only the operating point is allowed for a standing wave phenomena. So the condition for the open stopband suppression is $\omega_0 = \omega_s = \omega_p$ [6]. Furthermore, if the attenuation constant increases, the radiation beam width decreases. Considering an attenuated uniform current distribution along the z-direction, the radiated field into the free space is proportional to the Fourier transform of the current distribution called directivity [7].

$$\underline{D}(\phi) = \sin(\phi)\int_0^\infty e^{-\alpha_z z - j\beta_z z}e^{j\beta_0\cos(\phi)z}dz \quad (2.30)$$

$$D(\phi) = |\underline{D}(\phi)| = \frac{|\sin(\phi)|}{\sqrt{\alpha_z^2 + \beta_0^2\left(\cos(\phi) - \frac{\beta_z}{\beta_0}\right)^2}} \quad (2.31)$$

Neglecting the attenuation constant and finding the maximum directivity yields to propagation constant $\beta_z$ dependent beam. Representing the main beam direction with respect to broadside, a coordinate transformation is necessary:

$$\tilde{\phi} = \phi - \frac{\pi}{2}.$$

$$\tilde{\phi}_m \approx \arcsin\left(\frac{\beta_z}{\beta_0}\right) \quad (2.32)$$

The −3 dB beamwidth is a function of the attenuation constant, free space propagation constant and the main beam direction [6]:

$$\Delta\tilde{\phi} \approx \frac{\frac{\alpha_z}{\beta_0}}{\cos(\tilde{\phi}_m)} \quad (2.33)$$

Figure 51:
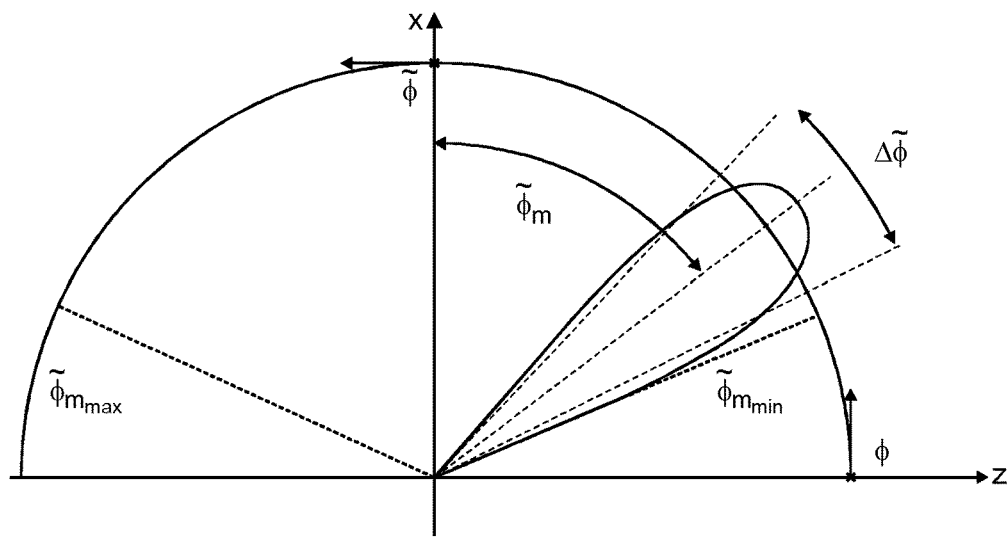
FIG. 51 shows the azimuth leaky wave radiation pattern parameter according to known leaky wave antenna technology.

FIG. 51 shows the azimuth leaky wave radiation pattern parameter. In FIG. 51 it will be shown that all parameters which shape the radiation pattern are also depicted in the dispersion diagram shown in FIG. 52. Hence, the dispersion diagram is an appropriate tool to design leaky wave antennas.

Furthermore, maximum and minimum main beam direction angles $\tilde{\phi}m_{min}$ and $\tilde{\phi}m_{max}$ respectively can transform to the dispersion diagram [1].

$$\sin(\tilde{\phi}_m) = \frac{\beta_{z0} + \frac{2\pi}{p}n}{\beta_0} = \frac{2n + \frac{\beta_{z0}p}{\pi}}{\frac{\beta_0 p}{\pi}} = \tan(\tilde{\phi}'_m) \quad (2.34)$$

Figure 52:
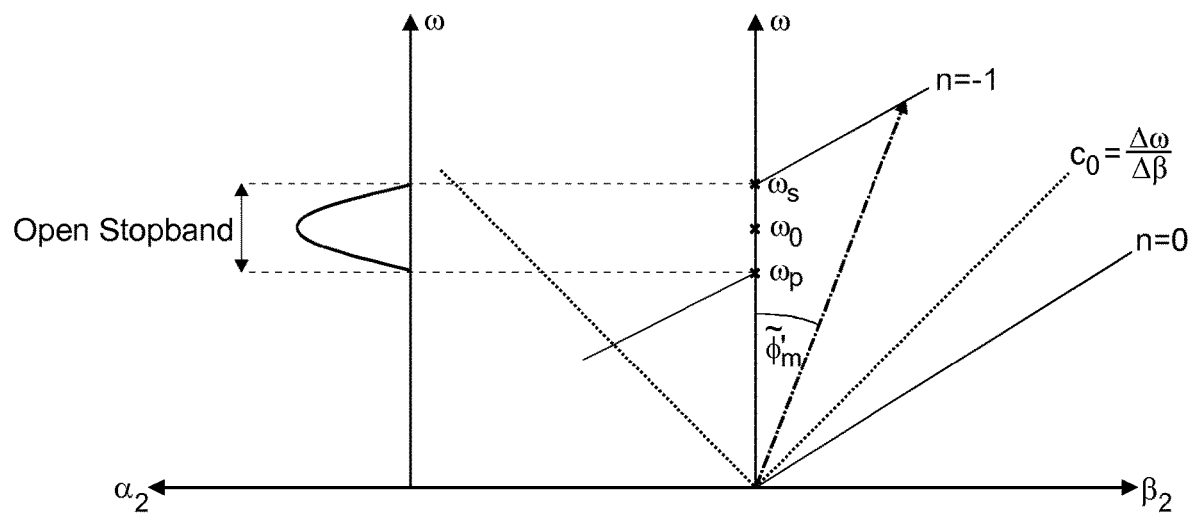
FIG. 52 shows a dispersion diagram according to known leaky wave antenna technology.

It is shown that the design procedure is done to the n=−1 mode. Also depicted in FIG. 52 is the radiation condition which is represented by the dotted lines. The region above the dotted lines is called fast wave region [1].

Considering the lossy case, the attenuation constant becomes frequency independent if the heavy side condition or Q-balancing is acquired [8]. The expression $\omega - \omega_s$ and $\omega - \omega_p$ respectively is replaced under the restriction of open stopband suppression by $\Delta\omega = \omega - \omega_0$ $$\underline{\gamma}_z = \alpha_z + j\beta_z \quad (2.35)$$

$$= \frac{\sqrt{R_s G_p}}{p}\sqrt{\left(1 + 2j\frac{\Delta\omega}{\omega_0}\frac{\omega_0 L_s}{R_s}\right)\left(1 + 2j\frac{\Delta\omega}{\omega_0}\frac{\omega_0 C_p}{G_p}\right)}$$

If the heavy side condition is met, the propagation constants slope is even the Q-factor $Q = Q_s = Q_p$.

$$Q_s = \frac{\omega_0 L_s}{R_s} \quad (2.36)$$

$$Q_p = \frac{\omega_0 C_p}{G_p} \quad (2.37)$$

Therefore, the minimum and maximum radiation angle depends on unit cells Q-factor.

$$\alpha_z = \frac{\sqrt{R_s G_p}}{p} \quad (2.38)$$

$$\beta_z = 2\frac{\Delta\omega}{\omega_0}Q\frac{\sqrt{R_s G_p}}{p} \quad (2.39)$$

The inverse tangent which is specified in 2.34 is equal to the slope. Hence, the Q-factor is just a function of the desired maximum radiation angle.

$$2Q\frac{\sqrt{R_s G_p}}{\omega_0 p} = 2\frac{Q}{\omega_0}\alpha_z = \frac{2\sin(\tilde{\phi}_{m_{max}})}{\Delta\omega_B} \quad (2.40)$$

At this point, a closed expression has been developed which is capable to transform antenna specification in lumped elements. If a mode based approach is present, it is helpful to consider the relationship between scattering parameter and the dispersion relation.

2.3 Scattering Parameter and Dispersion Relation

The relationship of equation 2.11 can be expressed by transmission parameter and scattering parameter respectively [9].

$$\cosh(\gamma_z p) = \frac{T_{11} + T_{22}}{2} = \frac{1 - \det(S)}{2 S_{21}} \quad (2.41)$$

Note that the hyperbolic function is periodic in its complex dimension. This means unwrapping is needed to get the desired dispersion relation.

3. Microstrip Unit Cell Modelling

In the following, the terms "antenna element", "patch", "unit cell" and "cell" will be used interchangeably for an element making up a leaky wave antenna. The major issues of unit cell modelling addressed by the invention are the suppression of the open stopband and the achievement of high slope in the dispersion relation which implies a highly frequency sensitive beam.

The unit cell according to an embodiment of the invention is in a form allowing the first spatial mode in z-direction to radiate. Furthermore the unit cells may be connected to each other, e.g. linearly, which yields to a series fed patch design.

3.1 Patch Geometry Considerations

Embodiments of the invention are based on series fed patch (SFP) leaky wave antenna. Regarding a single patch without any feed line, the design is accomplished by the cavity model [10]. Based on the cavity model, the radiated field can be calculated with equivalent magnetic currents. For fixed substrate height and to neglect mutual coupling effects, the magnetic current depends on the perimeter of microstrip geometry. If radiation is the only power loss in the structure the perimeter is proportional to the radiated power. Furthermore, the surface of microstrip geometry is a measure of bounded fields. Bounded fields imply stored energy, meaning that the definition of the Q-factor is simplified proportional to the ratio of area to perimeter.

$$Q = \frac{X}{R} \sim \frac{\iint \vec{E}^2 dA}{\oint \vec{E}^2 dl} \quad (3.1)$$

The geometry of the circle satisfies the condition of the best area to perimeter ratio. Hence, a circular patch is adopted according to embodiments of the invention.

3.2 Circular Series Fed Patch Design

Considering the patch itself, the simplification to the cavity model is valid. Furthermore, there is just one design parameter. The other parameters of interest such as the Q-factor and the radiation characteristic can be deduced from the radius. If the Q-factor and the radiation characteristic are known, a connection between modes of a circular cavity and lumped elements is possible.

3.2.1 Patch Radius

First, it is necessary to transform the coordinate system because there is now a rational symmetric problem. But the z-direction is still the propagation direction for the bounded wave.

$$z = r \cos(\phi) \quad (3.2)$$

$$y = r \sin(\phi) \quad (3.3)$$

Figure 2:
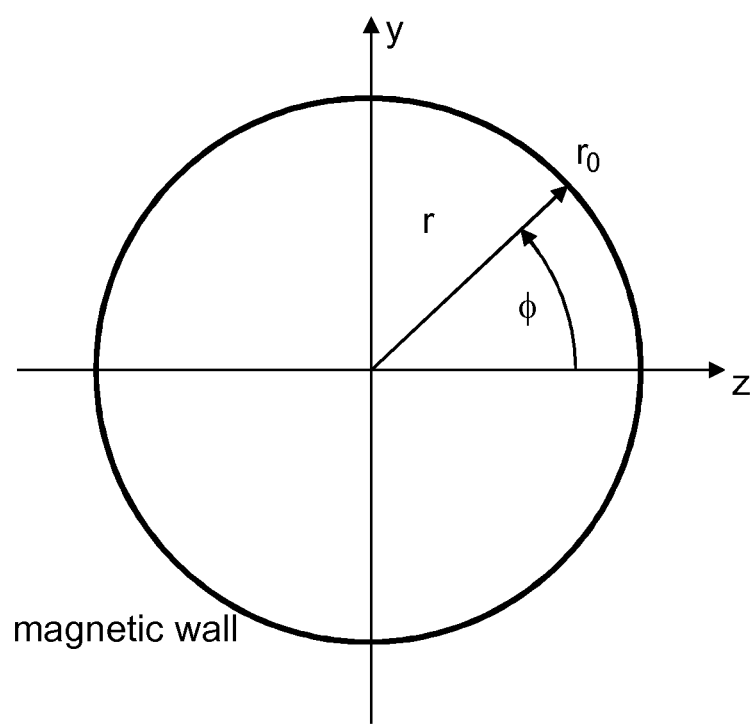
FIG. 2 shows the nomenclature of polar coordinates for circular patch, according to an embodiment of the invention.

FIG. 2 depicts the top view of a circular patch according to an embodiment of the invention. The circle has an effective radius r0 and constitutes a magnetic wall boundary condition.

The x-direction is not illustrated but still under investigation in the wave equation which can be expressed in cylindrical coordinates with a scalar magnetic vector potential [10].

$$\Delta A_x(r,\phi,x) + k^2 A_x(r,\phi,x) = 0 \quad (3.4)$$

According to embodiments of the invention the patch is manufactured using printed circuit board technology, the top and bottom of the patch are copper and are separated by the height of substrate h. For reasons of simplicity, the copper boundary is just an electric wall. The solution of the wave equation for this kind of cavity can be done by separating the variables [10].

$$A_x = \hat{A}_x \cdot J_m(k_r \cdot r) \cdot (A_c \cdot \cos(m\phi) + A_s \cdot \sin(m\phi)) \quad (3.5)$$

The solution is the product of first kind Bessel function of order n and trigonometric functions. Assuming that the substrate is very thin with respect to the wavelength, the above equation results to:

$$A_x = \hat{A}_x \cdot J_n(k_r \cdot r) \cdot (A_c \cdot \cos(n\phi) + A_s \cdot \sin(n\phi)) \quad (3.6)$$

Figure 3:
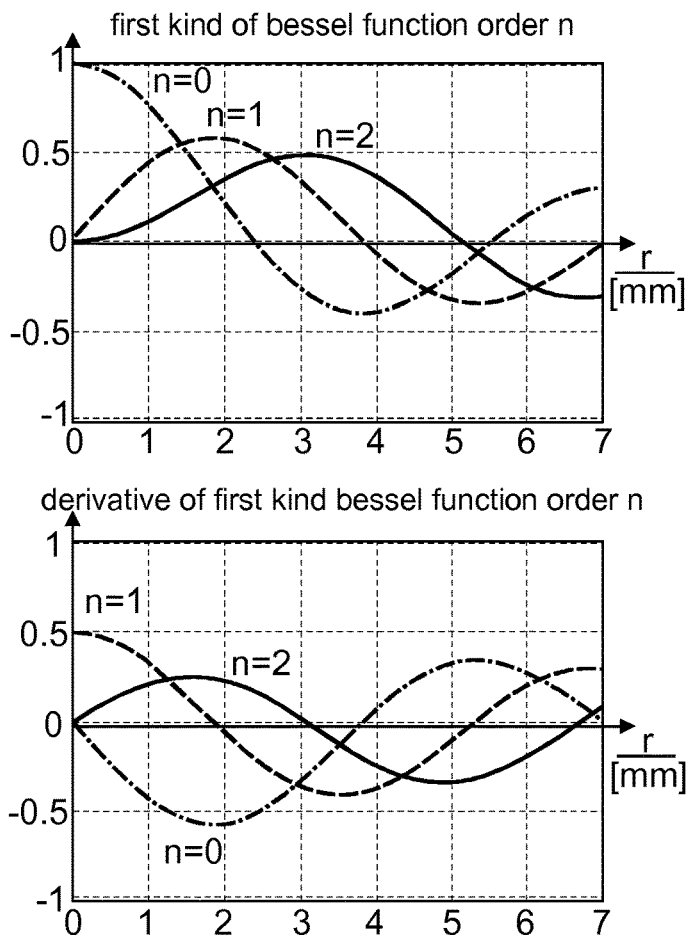
FIG. 3 shows the first kind Bessel function for orders zero to two.

FIG. 3 shows the first kind Bessel function for order zero to two.

It can be shown that the effective radius r0 influences the excited mode in two ways. First, the order of Bessel function and second with respect to satisfying the boundary condition the mth zero of Bessel function derivative. FIG. 3 shows the first three orders of Bessel function as a function of radius.

Considering the antenna operation in the worst case, the attenuation, as well as the Q-factor, should be high. A good compromise can be adopted using the first maxima of the first order Bessel function. This will be discussed in more detail hereinafter.

The dispersion relation of the circular cavity yields to the desired effective radius.

$$r_0 = \frac{\xi_{11} c_0}{\sqrt{\epsilon_e}\, \omega_0} \quad (3.7)$$

The first maxima of first kind Bessel function is denoted by $\xi 11 = 1.8412$ [10]. The relationship between the effective electric r0 and the geometric rg can be determined by numerical fitted function [10].

$$r_g = \frac{r_0}{\sqrt{1 + \frac{2h}{\pi \epsilon_r r_0}\left(\ln\left(\frac{\pi r_0}{2h}\right) + 1.7726\right)}} = 1.8631\ \text{mm} \quad (3.8)$$

3.2.2 Radiation Characteristic

Assuming the patch is linearly polarised in z-direction the bounded electric field results to [10]:

$$E_x = \hat{E}_x J_1(k_r \cdot r) \cos(\phi) \quad (3.9)$$

Using equivalent magnetic currents at the patch edges the radiated electric farfield yields to [10]

$$\vec{E}_{rad} = \begin{pmatrix} E_{rad_{r_r}} \\ E_{rad_{\theta_r}} \\ E_{rad_{\phi_r}} \end{pmatrix} \quad (3.10)$$

-continued $$= j\frac{k_0 r_0 V_0}{2r_r} e^{-jk_0 r_r} \left( J_0(k_0 r_0 \sin(\theta_r)) \begin{pmatrix} 0 \\ -\cos(\phi_r) \\ \cos(\theta_r)\sin(\phi_r) \end{pmatrix} + \right.$$

$$\left. J_2(k_0 r_0 \sin(\theta_r)) \begin{pmatrix} 0 \\ \cos(\phi_r) \\ \cos(\theta_r)\sin(\phi_r) \end{pmatrix} \right)$$

The radiated electric field can be used to determine the radiated power using its poynting vector. Integrating the poynting vector over a sphere, yields to the radiation conductance which can be numerically calculated [10].

$$G_{rad} = \frac{4\pi(k_0 r_0)^2}{\eta_0} \int_0^{\frac{\pi}{2}} ((J_0(k_0 r_0 \sin(\theta_r)) - J_2(k_0 r_0 \sin(\theta_r)))^2 + \cos^2(\theta_r)(J_0(k_0 r_0 \sin(\theta_r)) + J_2(k_0 r_0 \sin(\theta_r)))^2) \sin(\theta_r) d\theta_r \quad (3.11)$$

At this point, there is a connection between excited modes and their losses in a lumped element expression. The lumped elements for the susceptance can be deduced from the quality factor.

3.2.3 Quality Factor

Neglecting all losses except the radiation losses, the Q-factor is defined as:

$$Q = \frac{4\pi r_0 \omega_0 \epsilon_r \iint E_x^2 dA}{h G_{rad} \oint E_x^2 dl} \quad (3.12)$$

The equation above demonstrates that the consideration of the area-to-perimeter ratio is valid. Now the Q-factor is known and its general definition yields to the value of susceptance or reactance.

$$Q_s = \frac{X_s}{R_{rad}} = X_s G_{rad} \quad (3.13)$$

$$Q_p = \frac{Y_p}{G_{rad}} \quad (3.14)$$

This relationship fits well with the linearisation in Section 2 (Theory of Leaky Wave Antennas) hereinabove. The difference is that in Section 2 two resonant circuits have been presented. The following section will discuss this difference.

3.3 Q-Balancing and Mode Excitation

A wave is able to propagate along a structure if there is an excitation of series and shunt mode. Furthermore, for artificial transmission line segments, the balanced condition must be met.

3.3.1 Even and Odd Mode Contribution

Figure 4:
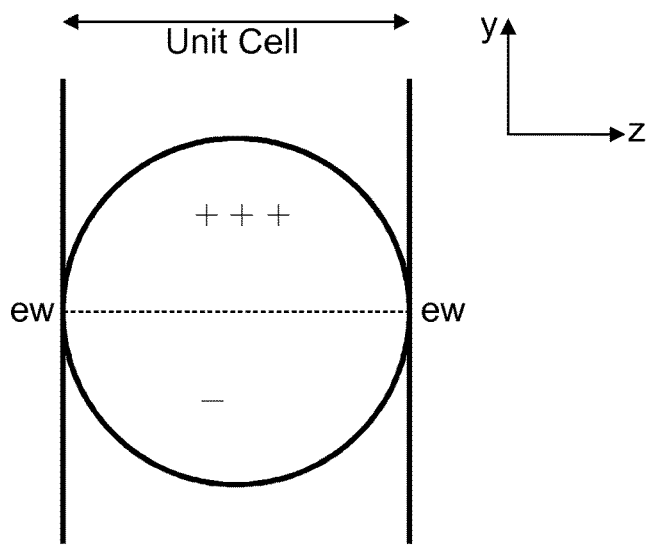
FIG. 4 shows the electric boundary condition in propagation direction, according to an embodiment of the invention.

As shown in FIG. 50 the basic approach for unit cell design is the even and odd analysis. Even and odd analysis in mode considerations yields to a magnetic wall boundary in z-direction for shunt mode and electric wall boundary condition for series mode respectively [11]. FIG. 4 shows the electric boundary condition in the propagation direction, demonstrating the boundary condition for electric wall boundary condition because the magnetic boundary condition is still met by the cavity model.

FIG. 4 illustrates that the electric boundary condition forces a shunt mode. Taking account of the coordinate transformation the appropriate wave equation solution of the bounded electric field is:

$$E_{x_p} = \hat{E}_{x_p} J_1(k_r \cdot r) \sin(\phi) \quad (3.15)$$

So the solution of wave equation's series mode is:

$$E_{x_s} = \hat{E}_{x_s} J_1(k_r \cdot r) \cos(\phi) \quad (3.16)$$

The superposition of both modes yields to the electric field which has to be excited.

$$E_x = J_1(k_r \cdot r)(\hat{E}_{x_s} \cos(\phi) + \hat{E}_{x_p} \sin(\phi)) \quad (3.17)$$

The transition from even to shunt mode is continuous. Furthermore, the mode excitation should be done by a single feed line. But a single feed line has the only capability of exciting the series or shunt mode respectively. Hence, consideration of mode excitation is necessary.

3.3.2 Analysis of One Port Excited Circular Patches

Assuming that the feeding port is infinitely small and positioned at the point P and the port is perfectly matched. The circle center is equal to the coordinate system center.

$$P = (r, \phi) = (r_0, \phi_0) \quad (3.18)$$

The excitation signal waveform is sinusoidal and a transversal electromagnetic wave. If these conditions are satisfied, the complex source amplitude is equal to the complex mode amplitude at this point. This yields to a boundary condition in $\phi$-direction.

$$J_1(k_r \cdot r_0)(E_{x_s}(t)\cos(\phi) + \hat{E}_{x_p}(t)\sin(\phi)) = E_e'(t, \phi_0) \quad (3.19)$$

$$\hat{E}_{x_s}(t)\cos(\phi) + \hat{E}_{x_p}(t)\sin(\phi) = E_e(t, \phi_0) \quad (3.20)$$

Equation 3.20 has an infinite number of solutions, but the law of energy conversation yields to the constraint that the point $\phi 0$ is a global extremum.

$$\left. \frac{\partial}{\partial \phi} \hat{E}_{x_s}(t)\cos(\phi) + \hat{E}_{x_p}(t)\sin(\phi) \right|_{\phi=\phi_0} = 0 \quad (3.21)$$

The wave equation solution for an arbitrary position of excitation yields to:

$$E_x = \hat{E}_x J_1(k_r \cdot r)\cos(\phi - \phi_0) \quad (3.22)$$

So with a single feed line, this excites just a standing wave within the bounded patch field. In order to achieve series and shunt modes the field in $\phi$-direction should rotate. From a mathematical point of view, the desired bounded field looks like:

$$E_{x_d} = (\hat{E}_x J_1(k_r \cdot r)(\hat{E}_{x_a}\cos(\phi - \omega t) + \hat{E}_{x_p}\sin(\phi - \omega t)) \quad (3.23)$$

A general definition for a one dimensional standing wave is:

$$A(x,t) = \hat{A}\cos(\omega t + \phi_\omega)\cos(k_x x + \phi_{k_x}) \quad (3.24)$$

Trigonometric decomposition yields to:

$$A(x,t) = \hat{A}(\cos(\omega_0 t - k_x 0 x + \phi_\omega') + \cos(\omega_0 t + k_x 0 x + \phi_{k_x}'))$$

$$A(x,t) = \hat{A}(\cos(\omega_0 t - k_x 0 x + \phi_\omega') + \cos(\omega_0 t - (-k_x 0 x) + \phi_{k_x}')) \quad (3.25)$$

So every standing wave can be interpreted as a superposition of forward and backward travelling wave with the same amplitude. The basic principle is to achieve destructive interference of backward propagating waves and constructive interference of forward propagating wave using passive boundary conditions. This principle will be described in more detail in the following section.

Now an objective function is necessary to suppress the standing wave phenomena. Regarding equation 3.25, the right term has to be cancelled. To simplify the expression, 3.25 will be Fourier transformed to both variables.

$$A'(k_x, \omega) = \frac{\hat{A}}{2}\left(e^{j\varphi'_\omega}(\delta(\omega-\omega_0)\delta(k_x+k_{x0}) + \delta(\omega+\omega_0)\delta(k_x-k_{x0})) + e^{j\varphi'_{k_x}}(\delta(\omega-\omega_0)\delta(k_x-k_{x0}) + \delta(\omega+\omega_0)\delta(k_x+k_{x0}))\right) \quad (3.26)$$

The addition of the Hilbert transform of both variables yields to cancel out the left term of equation 3.25. Hence, if there is no standing wave phenomena, the following expression becomes zero. In other words this expression has to be zero to avoid standing waves.

$$-jsgn(\omega)A'(k_x,\omega)-jsgn(k_x)A'(k_x,\omega)=0$$

$$j\hat{A}e^{j\varphi'k_x}(\delta(\omega-\omega_0)\delta(k_x-k_{x0})+\delta(\omega+\omega_0)\delta(k_x+k_{x0}))=0 \quad (3.27)$$

Each mathematical transformation has the capability of superposition as well as the physical environment. So the superposition of complex standing waves in equation 3.27 is valid.

$$\sum_{i=1}^{N} \hat{A}_i e^{j\varphi'_{k_{xi}}} = 0 \quad (3.28)$$

$$\sum_{i=1}^{N} \hat{A}_i e^{j(\varphi_{k_{xi}}+\varphi_{\omega i})} = 0$$

The number of ports are represented by N. Each port has a spatial angle $\varphi_{k_{xi}}$ and an electric angle $\varphi_{\omega i}$ and an excitation amplitude $\hat{A}_i$. Equation 3.28 is a condition for a propagating wave in φ-direction which is very similar to a mode rotation. This rotation can be done by two different feeding ports but only one feed line is available. Regarding the derivation of the above condition, there is a degree of freedom. In case of equation 3.27, both Hilbert transforms has been added which implies cancelling the backward travelling wave. If the Hilbert transforms were subtracted the forward travelling will be cancelled. So this relationship is very similar to the Single-Sideband Modulation where the upper side-band implies positive rotation and the lower sideband implies negative rotation. For the sake of completeness the condition to suppress the upper sideband is:

$$\sum_{i=1}^{N} \hat{A}_i e^{j(\varphi_{k_{xi}}-\varphi_{\omega i})} = 0 \quad (3.29)$$

This expression is even the rotation condition.

3.3.3 Passive Spatial Mode Filter

Embodiments of the invention involve filtering an undesired mode in a passive structure which has a single feed. In order to simplify the problem, the structure may be transversal symmetric. This means the unit cell is symmetric with respect to the xy-plane. So the feeding point has to be in the symmetry plane. In order to achieve a passive mode excitation a loop may" be constructed.

Figure 5:
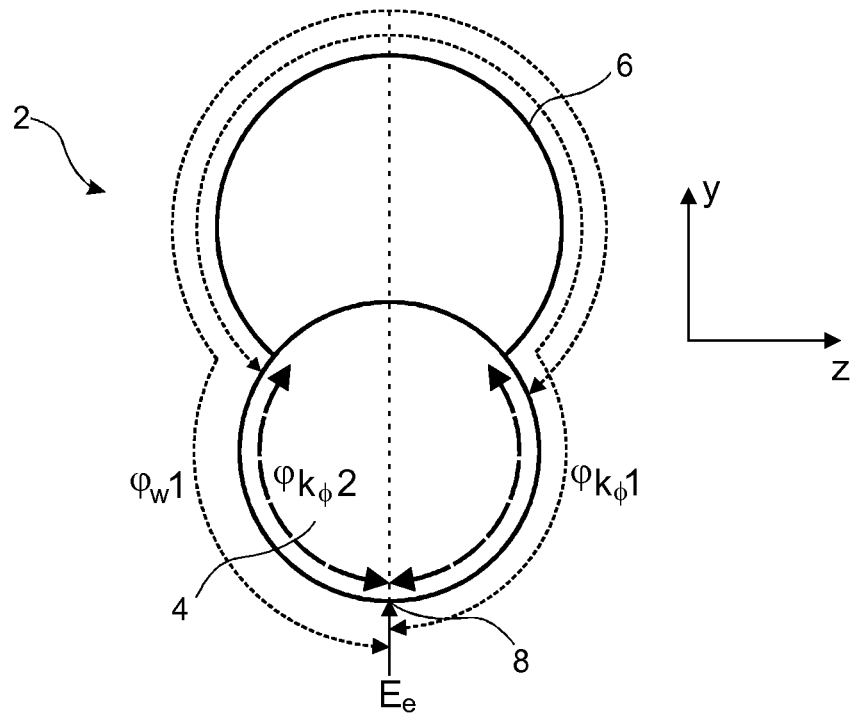
FIG. 5 shows a unit cell with filter loop, according to an embodiment of the invention.

"Passive" in this context means that every electrical phase φωi is related to the excitation signal Ee. Note that choosing the right or left path of determining the phase shift is trivial because the circle has a phase perimeter of 2π. FIG. 5 shows an embodiment of an antenna element (unit cell) 2 comprising a filled circular cell (patch) 4 with filter loop 6. (As will be appreciated, cell 4 and filter loop 6 are formed of copper on a dielectric substrate (not shown), using e.g. PCB manufacturing techniques.) The cell 4 is configured to be attached at point 8 in a stub configuration to a feed line (not shown). Using the symmetry condition and inserting the parameter of FIG. 5 in equation 3.28 yields to the calculation 3.31. Furthermore, it will be assumed that the attenuation is very low and the amplitude will be approximately constant. The excitation position constitutes the origin.

$$1+e^{j(-\varphi_{\omega 1}+\varphi_{\phi 1})}+e^{j(\varphi_{\omega 2}-\varphi_{\phi 2})}=0$$

$$1+e^{j(-\varphi_{\omega 1}+\varphi_{\phi 1})}+e^{-j(-\varphi_{\omega 1}+\varphi_{\phi 1})}=0$$

$$\cos(\varphi_{\phi 1}-\varphi_{\omega 1})=-\tfrac{1}{2} \quad (3.30)$$

There is one degree of freedom to determine the different phase shifts. A valid solution with respect to a practical designable radius of the loop is $\varphi_{\omega 1}=4/3\pi$ and $\varphi_{\phi 1}=2/3\pi$.

The next section will consider the feeding structure and the associated resonant frequency of modes.

3.4 Feeding Line and Design Parameter

Discussion of radiation at broadside is comparable to that of a phased array. A phased array radiates at broadside if all antennas are in phase. According to embodiments of the leaky wave antenna design, this means that it is necessary that the phase shift within each unit cell is 2πn where n is an integer. This matches with the results of Section 2 hereinabove to excite the nth mode at the resonant frequency.

$$\beta_z \approx \frac{2}{p}\frac{\omega-\omega_0}{\omega_0}Q\alpha_z \quad (3.31)$$

Figure 6:
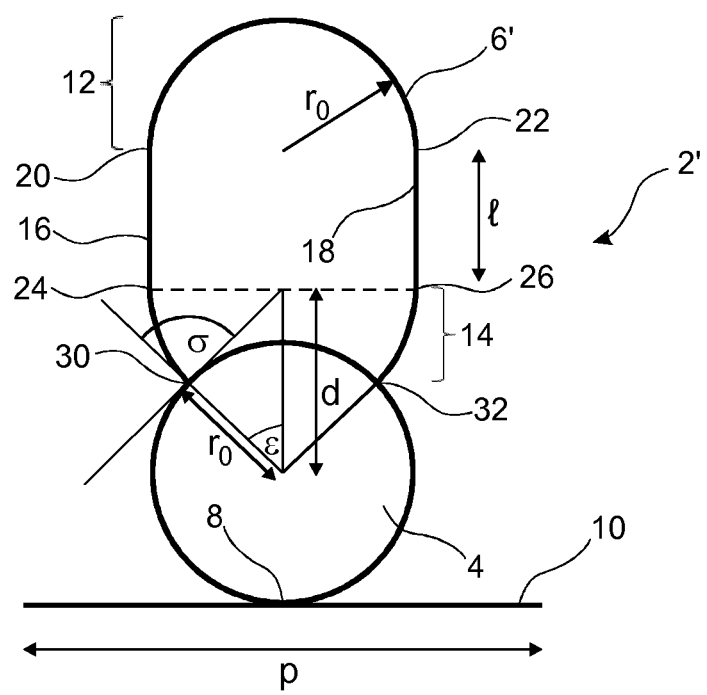
FIG. 6 shows a schematic view of an embodiment of a unit cell according to the invention.

FIG. 6 schematically shows a schematic view of an embodiment of a unit cell 2'. This is the same as the embodiment of FIG. 5, except as described as follows. The unit cell 2' is attached to a portion 10 of feed line of length p. In this form, the (filter) loop 6' comprises a delay loop formed by upper half circle 12, lower half circle 14 and straight line lengths 16, 18 of conductor. A first length 16 couples first end 20 of upper half circle 12 with first end 24 of lower half circle 14, and second length 18 couples second end 22 of upper half circle 12 with second end 26 of lower half circle 14. The foregoing details are presented for the purpose only of understanding form, and it will be appreciated that cell 4 and delay loop 6' are integrally formed during manufacture. The delay loop 6' joins the cell 4 at points 30, 32.

In order to achieve a compact structure, the n=−1 mode is chosen. Hence, the unit cell period is even the effective wavelength $p=\lambda_{eff}$. The approach is to design a straight line with a wave impedance of 70Ω and a length of $\lambda_{eff}$ and the circle above the line. It is not necessary that the loop wave impedance is matched because matched means there is no standing wave. This is adjusted by the rotation condition. So the impedance is set to 70Ω. Using formulation in [10] the width and the corresponding effective length can be determined. At this point, the unit cell structure is completely determined.

Table 3.1 shows values of the analytic calculated antenna parameter.

TABLE 3.1 analytic calculated antenna parameter

| | analytic unit cell calculation |
|---|---|
| $\dfrac{r_g}{mm}$ | 1.8631 |
| $\dfrac{l}{mm}$ | 2.2928 |
| $\dfrac{p}{mm}$ | 7.5727 |
| $\epsilon$ | 60° |
| $\dfrac{d}{mm}$ | 2.2751 |
| $\epsilon_r$ | 3.6 |
| $\dfrac{w}{mm}$ | 0.3063 |
| $\dfrac{h}{mm}$ | 0.256 |
| $\dfrac{h_{C_u}}{mm}$ | 0.035 |

In embodiments, the feeding line has to satisfy the certain electric and magnetic wall boundary conditions in order to achieve an even and odd mode excitation. In the following chapter this issue will be discussed in more detail.

4. Optimization and Verification

Embodiments of the unit cell design are based on the cavity model. In order to address coupling effects, a full wave improvement is preferably done, as discussed hereinafter. First, the unit cell according to an embodiment and the aforementioned rotation condition are verified with respect to the even odd analysis. Later, the unit cell considerations are expanded to an array structure and mutual coupling effects are discussed. Finally, the transmission line characteristics as discussed in Section 2 hereinabove are addressed and are compared within the simulated farfield as well as within the measurement data.

4.1 Unit Cell Full Wave Optimization Considerations

The structure of the unit cell 2' according to an embodiment is schematically depicted in FIG. 6. In embodiments, the structure consists of three elements: a delay loop 6', a feeding line (portion) 10 and the resonant circular patch 4. If the condition of destructive interference is met, the delay loop guides a propagating wave and the field inside the circle rotates in a mathematical positive manner. Coupling effects and a small radius of the delay loop influence the real electrical length. So the length of delay loop has to be adjusted as well as the length of feeding line. The electrical length of the feeding line is influenced by capacitive coupling with respect to the resonant circular patch. The capacitive coupling also influences the resonant frequency of the patch.

4.1.1 Mode Rotation and Reflection Coefficient Improvement

The quality factor balancing condition is the even the rotation condition. In other words, the rotation condition means that only the n=−1 mode is excited while the n=1 mode is suppressed. Hence, a travelling wave appears by even and odd considerations, as depicted in FIG. 7.

Figure 7:
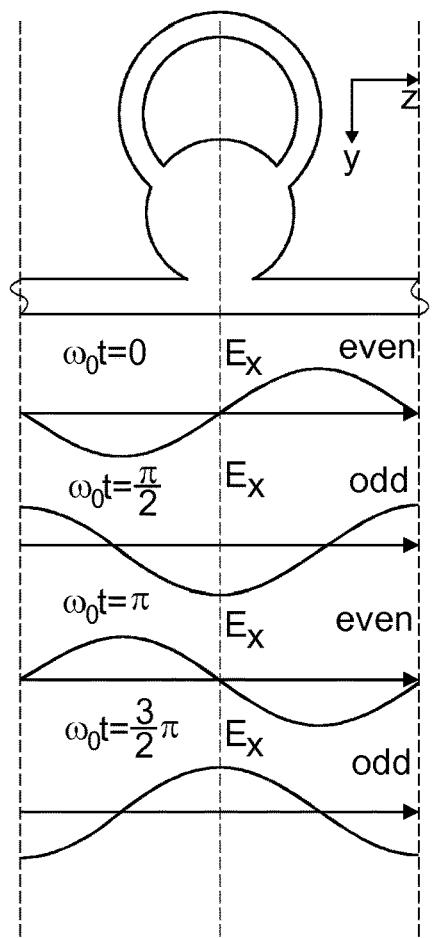
FIG. 7 shows a unit cell's even and odd excitation, according to an embodiment of the invention.

FIG. 7 demonstrates graphically a unit cell's even and odd excitation and how a travelling wave condition is related to this description. Furthermore, the even and odd modes are equivalent to orthogonal modes. A full wave simulation of the structure according to the above-described embodiment within the calculated parameters of Table 3.1 yield the following electrical field distribution as depicted in FIGS. 8 to 10, corresponding respectively to f=25 GHz and ωt=0, f=25 GHz and ωt=π/2, and f=25 GHz and ωt=π.

Figure 8:
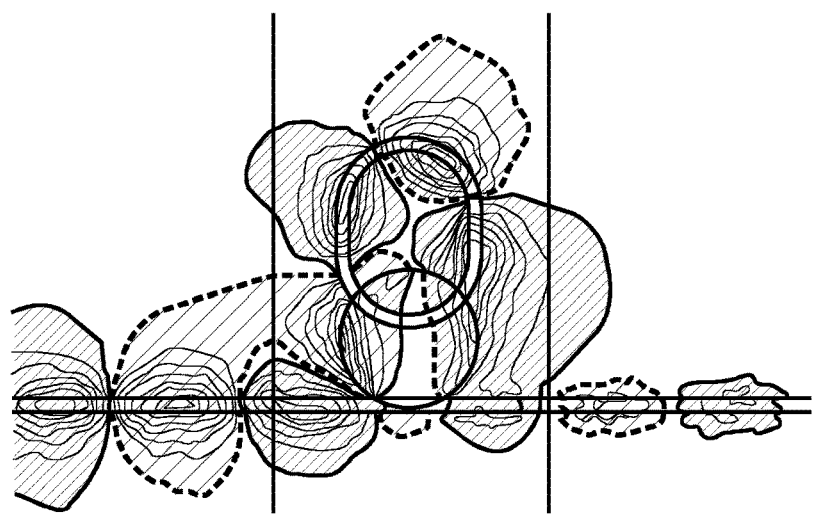
FIG. 8 shows a unit cell with f=25 GHz and ωt=0, according to an embodiment of the invention.
Figure 9:
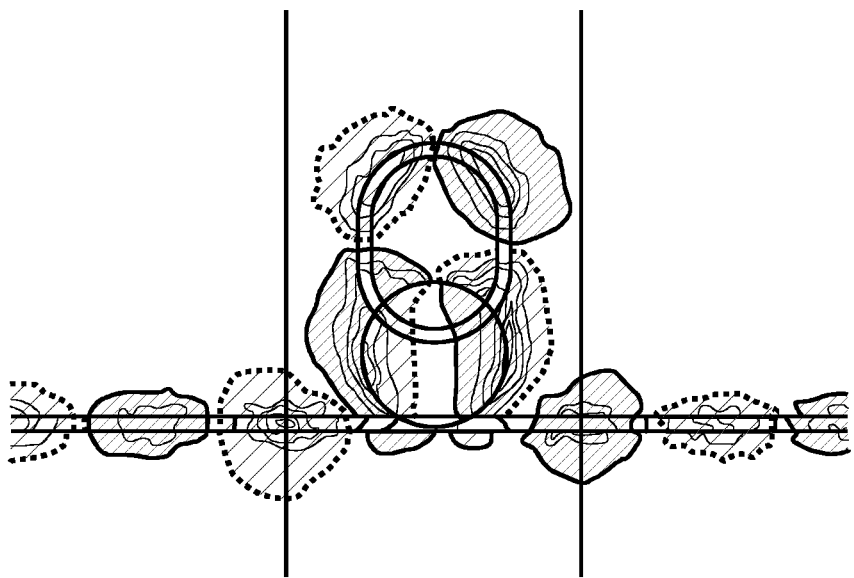
FIG. 9 shows a unit cell with f=25 GHz and ωt=π/2, according to an embodiment of the invention.
Figure 10:
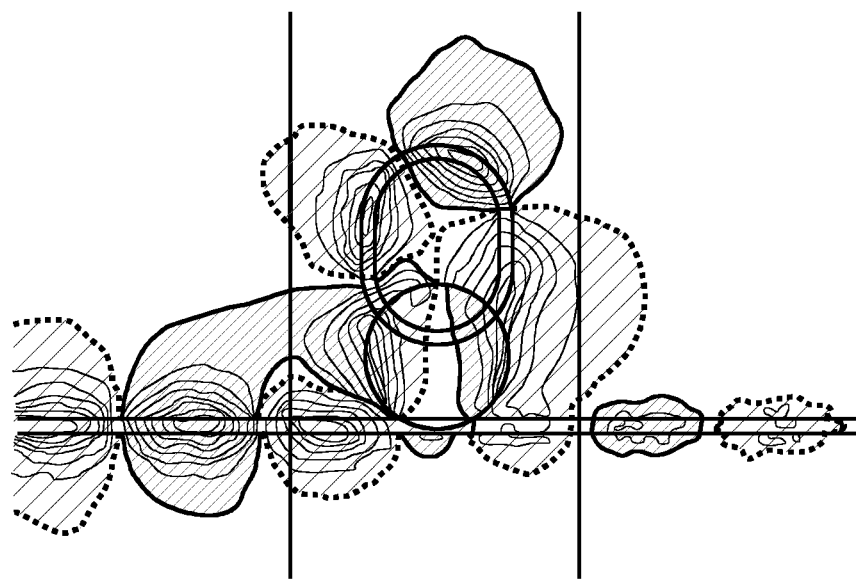
FIG. 10 shows a unit cell with f=25 GHz and ωt=π, according to an embodiment of the invention.

In FIGS. 8-10, the vertical lines are the unit cell boundaries and should be equal to the electrical length of the bounded field. The electric field Ex in FIG. 7 represents just the field distribution in the feeding line. If the boundary conditions for even and odd excitation are met, there are three electrical symmetry planes which have to be satisfied. These planes are the inception, the end and the middle of the unit cell. In even mode, these planes are electrical wall boundaries and for odd mode excitation the symmetry planes are magnetic walls.

The comparison of FIGS. 8-10 shows that there is no orthogonal mode excitation. In the circular patch, only the even mode excited, so a standing wave appears. This standing wave phenomena is the aforementioned open stopband problem.

Figure 11:
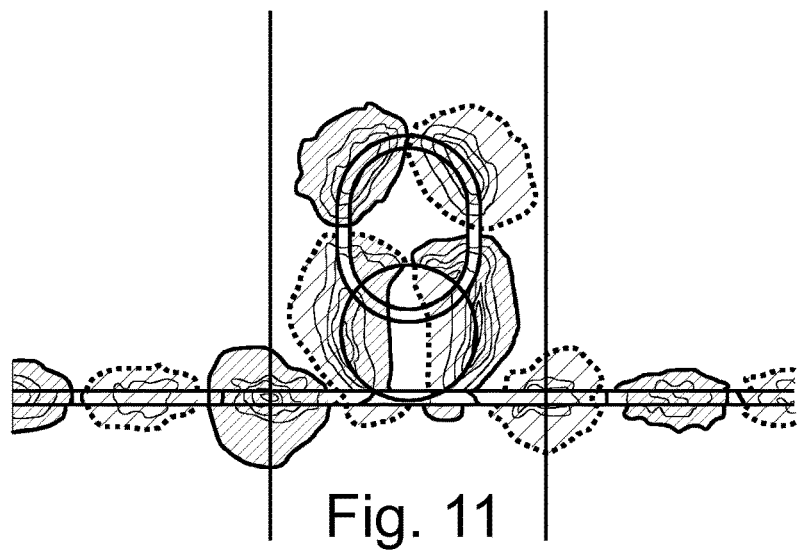
FIG. 11 shows a unit cell with f=25 GHz and ωt=3π/2, according to an embodiment of the invention.

FIG. 11 shows an embodiment of a unit cell with f=25 GHz and ωt=3π/2.

Figure 12:
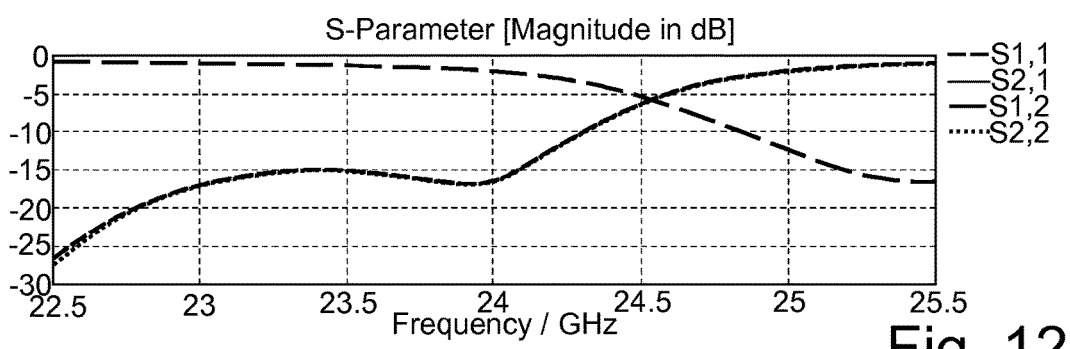
FIG. 12 shows a simulated unit cell scattering parameter amplitude, according to an embodiment of the invention.

An indication of the open stopband is the high attenuation per unit cell, which can be seen in the scattering parameter with respect to a high degradation of the transmission factor. FIG. 12 shows a simulated unit cell scattering parameter amplitude.

Figure 13:
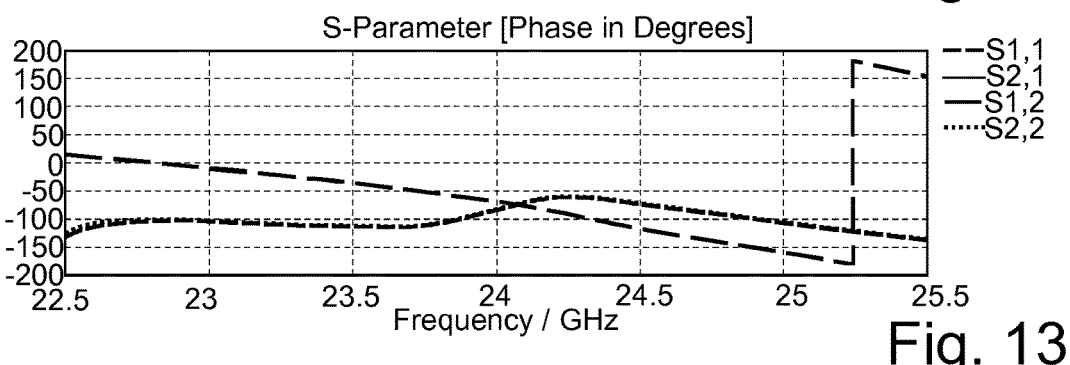
FIG. 13 shows a simulated unit cell scattering parameter phase, according to an embodiment of the invention.

Furthermore, the electrical wave length is influenced which can be seen in the phase information of the transmission factor. FIG. 13 shows a Simulated Unit Cell Scattering Parameter Phase In order to achieve series and shunt mode excitation as well as the performance of Q-balancing, conditioning a smooth rotating bounded field inside the circular patch is performed. As calculated in the unit cell modelling, it is necessary to suppress the n=1 mode. The ratio of n=−1 and n=1 is equal to the reflection coefficient. So this parameter is considered.

Figure 14:
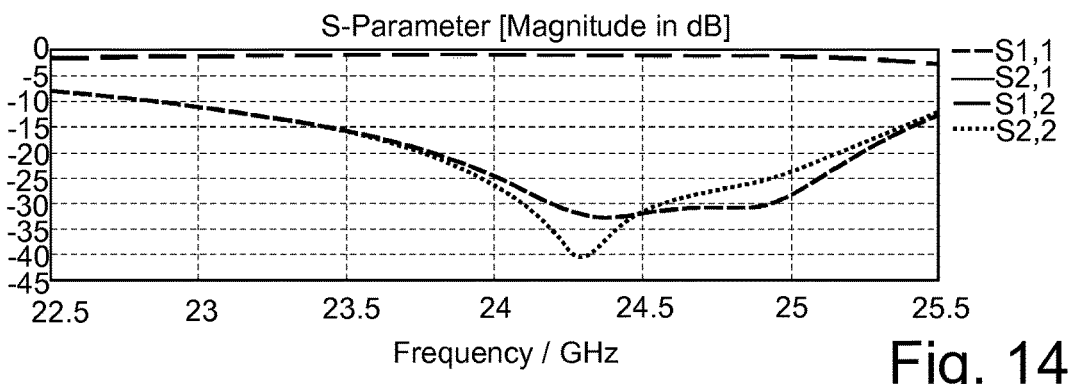
FIG. 14 shows a simulated improved unit cell scattering parameter amplitude, according to an embodiment of the invention.

The adjustment of delay loop length yields to the improvement of reflection coefficient in a wide frequency band. The variation of patch radius shifts the minimum of the reflection coefficient. FIG. 14 shows a simulated improved unit cell scattering parameter amplitude.

Figure 15:
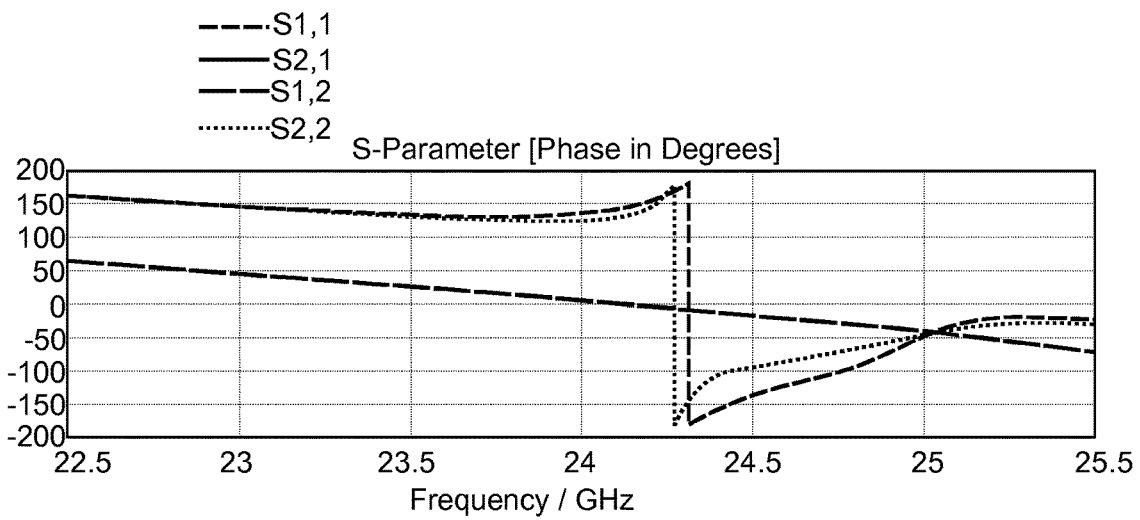
FIG. 15 shows a simulated improved unit cell scattering parameter phase, according to an embodiment of the invention.
Figure 16:
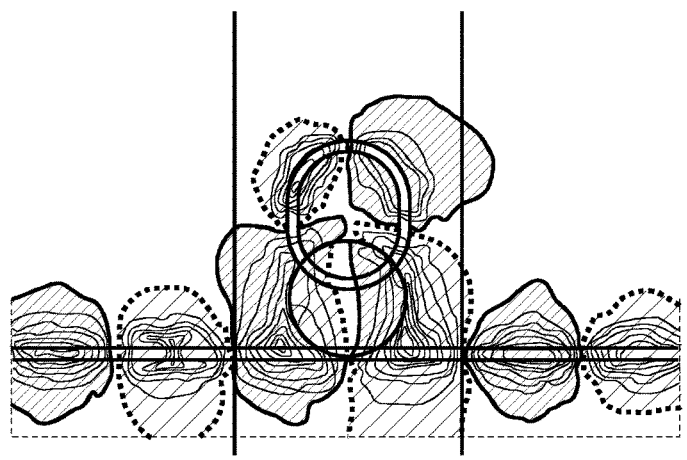
FIG. 16 shows an improved unit cell with f=24.125 GHz and ωt=0, according to an embodiment of the invention.
Figure 17:
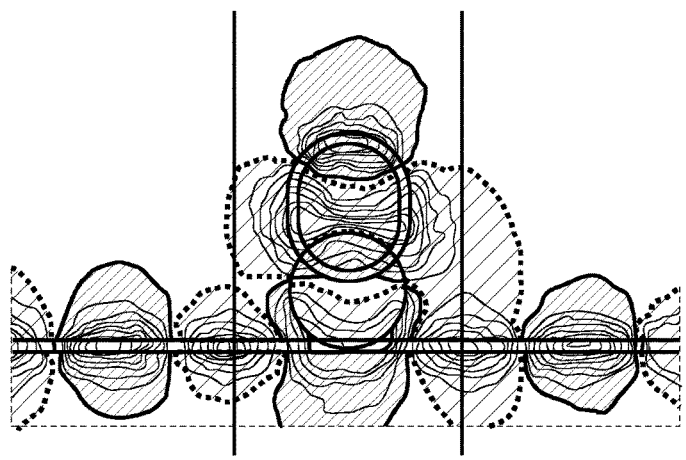
FIG. 17 shows an improved unit cell with f=24.125 GHz and ωt=π/2, according to an embodiment of the invention.
Figure 18:
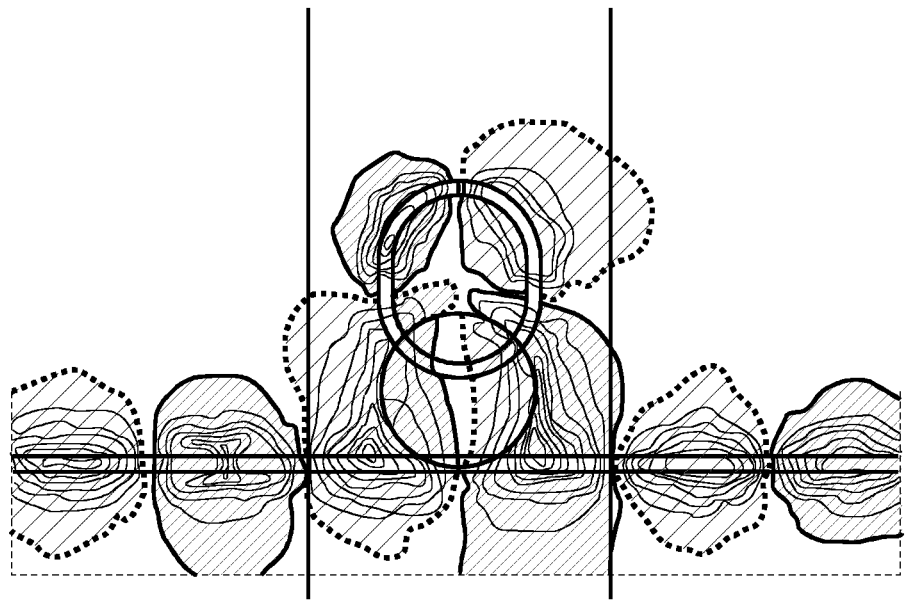
FIG. 18 shows an improved unit cell with f=24.125 GHz and ωt=π, according to an embodiment of the invention.
Figure 19:
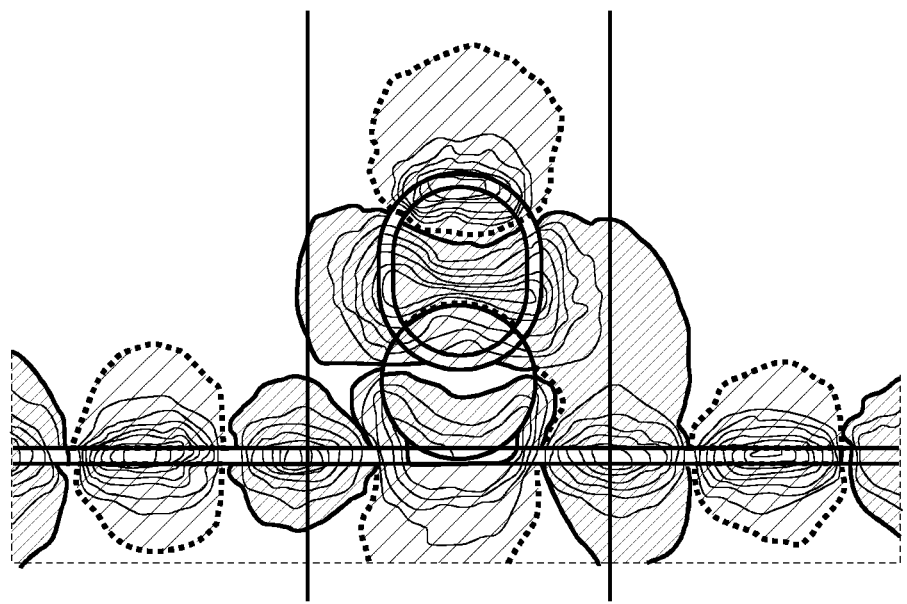
FIG. 19 shows an improved unit cell with f=24.125 GHz and ωt=3π/2, according to an embodiment of the invention.

Furthermore, coupling effects between the patch and the feeding line affects the electrical length of feeding line. In order to achieve broad side radiation within the centre frequency, the transmission factor phase shift should be zero at this frequency. The adaptation of feeding line length yields to the zero phase at centre frequency condition. FIG. 15 shows a simulated improved unit cell scattering parameter phase.

The following table shows the new parameter set improved by full wave simulation:

TABLE 4.1

Improved Unit Cell

| | analytic unit cell | improved Unit Cell |
|---|---|---|
| $\frac{r_o}{mm}$ | 1.8631 | 1.8 |
| $\frac{l}{mm}$ | 2.2928 | 1.4035 |
| $\frac{p}{mm}$ | 7.5727 | 7.2361 |
| $\epsilon$ | 60° | 60° |
| $\frac{d}{mm}$ | 2.2751 | 2.1981 |
| $\epsilon_r$ | 3.6 | 3.6 |
| $\frac{w}{mm}$ | 0.3063 | 0.3063 |
| $\frac{h}{mm}$ | 0.256 | 0.256 |
| $\frac{h_{C_u}}{mm}$ | 0.035 | 0.035 |

FIGS. 16 to 19 show the electrical field distribution for the improved unit cell configuration, for f=24.125 GHz and ωt=0, f=24.125 GHz and ωt=π/2, f=24.125 GHz and ωt=π and f=24.125 GHz and ωt=3π/2. Every field distribution satisfies the symmetry plane boundary conditions. So the rotating condition as well as the Q-balancing condition is met.

The comparison between the phase information and the field distribution yields to the right handed rotating field as predicted in the unit cell modelling. The delay loop guides a travelling wave which can be verified by the virtual middle symmetry plane.

The improved unit cell configuration fits very well with theoretical considerations. It is shown that the even mode is represented by an electric field distribution within a cosine function in angle direction and the odd mode is represented by sine function which also indicates the orthogonally mode excitation.

4.1.2 Dispersion Relation

Figure 20:
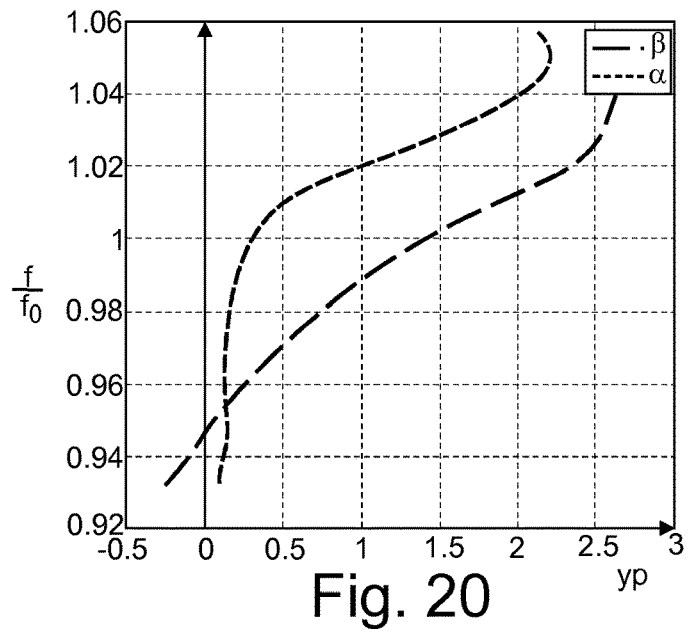
FIG. 20 shows a unit cell dispersion relation, according to an embodiment of the invention.

As aforementioned, the dispersion relation is a powerful tool to verify the Q-balancing as well as the broad side radiation issue. In the previous subsection the open stopband effect was discussed. As mentioned in Section 2 hereinabove, the open stopband affects an increasing attenuation constant and a nonlinear propagation constant respectively. In the dispersion relation (FIG. 20) this effect can be seen for normalized frequencies above 1.01. That is the reason that in the previous subsection the field distribution of 25 GHz is depicted where the open stopband effect appears. Hence, Q-balancing can be improved by adaptation of delay loop length. The normalized frequency intercept corresponds to the zero phase point of the transmission factor. So the intercept can be adjusted by the adaptation of the feeding line length.

Figure 21:
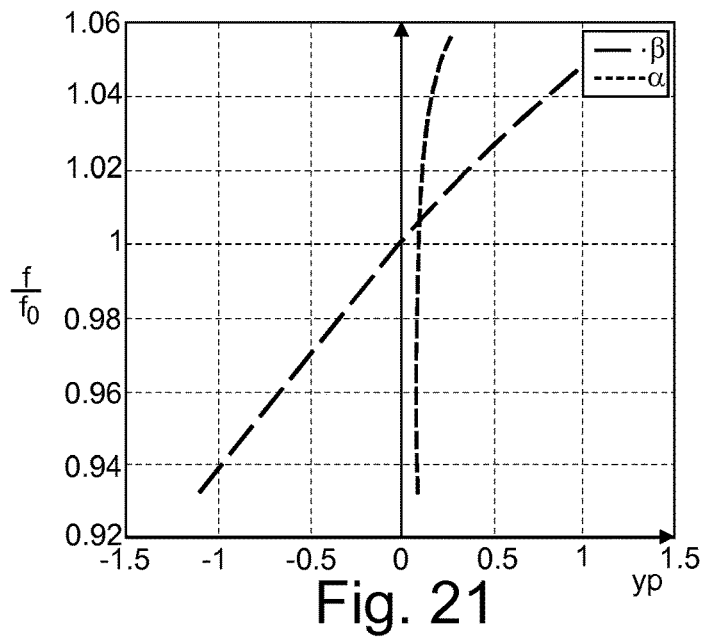
FIG. 21 shows an improved unit cell dispersion relation, according to an embodiment of the invention.

FIG. 21 shows the dispersion relation after improving the design parameter. Q-balancing is achieved and the attenuation constant is flat in a wide frequency range. The propagation constant is approximately linear and the intercept is near the normalized frequency.

4.2 Array Full Wave Considerations

The next step is the expansion from a unit cell to an array structure under the condition that 90% of the input power is radiated. A big problem with array structures is mutual coupling effects. Another important design parameter is the degree of circular polarisation, which can be measured by the axial ratio of far field.

4.2.1 Mutual Coupling Effects and Axial Ratio

For printed circuit structures, in accordance with embodiments of the invention, the cavity model is valid. Furthermore, coupling effects are simply mechanisms of the outside field's interference, and the reciprocity theorem is valid. Hence, coupling effects can described by equivalent magnetic currents. It can be shown for geometrically small or high impedance transmission lines the magnetic currents are approximate zero. Only coupling is affected by the circular patch in accordance with embodiments. Within each unit cell a resulting even and odd magnetic current appears. The superposition of the excited modes of coupling and feeding line yields to a resulting bounded field. The coupling fields can be left or right handed polarized. The left handed polarization affects the excitation of the n=1 spatial harmonic mode. The right handed polarization affects the excitation of the n=−1 mode. The positive mode influences the reflection factor and the negative one the transmission factor. A full wave simulation confirms the described effects.

Figure 22:
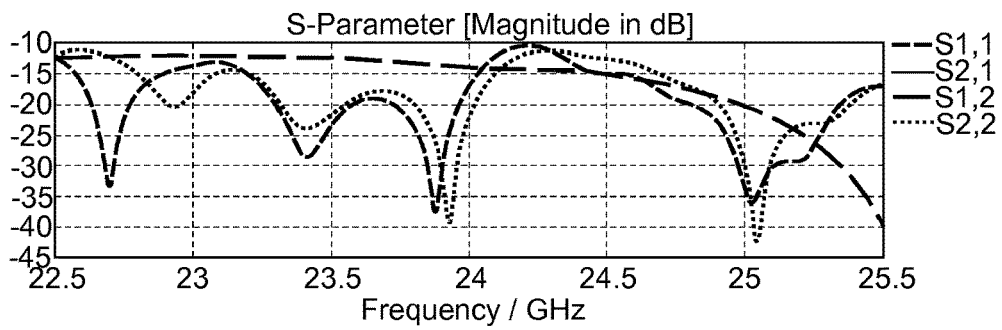
FIG. 22 shows scattering parameter amplitude for a 15 cell array, according to an embodiment of the invention.

FIG. 22 shows the scattering parameter amplitude for a 15 cell array.

Optimization can be done by the variation of the delay loop length as well as the variation of feeding line length. Variation of delay loop length is able to suppress the n=1 mode. The adaptation of feeding line length is necessary because the sum of an amount of modes with different amplitudes and phases yields a phase shift in the resulting mode. This unnecessary phase shift can be compensated by length adaptation.

As aforementioned, another parameter is the farfield axial ratio which describes the ratio of main axis of the electrical field. For a circle, the ratio is 1, or 0 dB.

Figure 23:
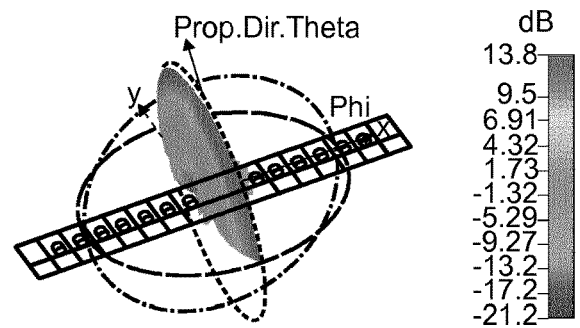
FIG. 23 shows an improved 15 cell array 3D farfield radiation pattern, according to an embodiment of the invention.
Figure 24:
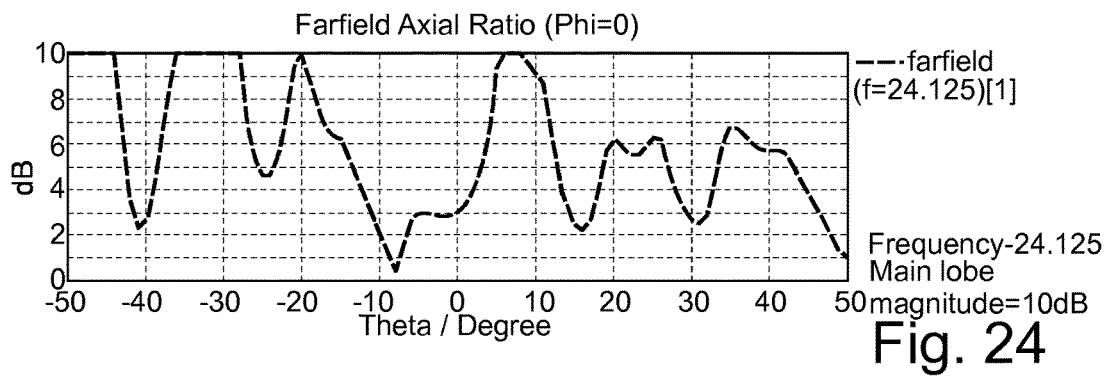
FIG. 24 shows an axial ratio for a 15 cell array with φ=0°, according to an embodiment of the invention.
Figure 25:
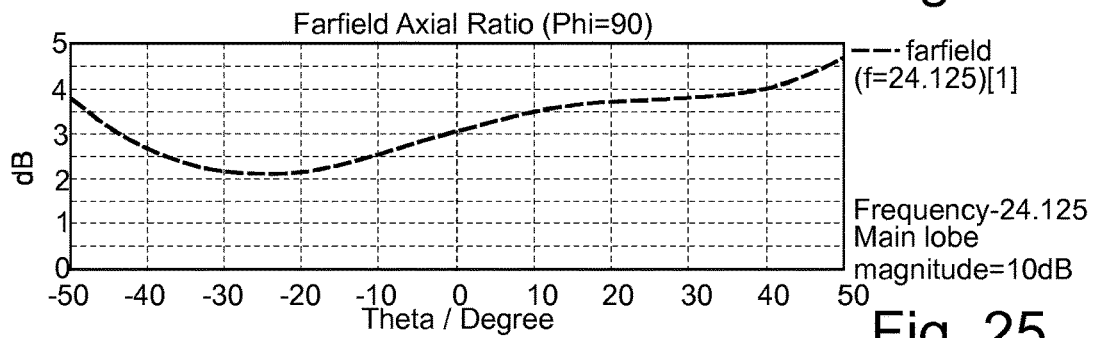
FIG. 25 shows an axial ratio for a 15 cell array with φ=90°, according to an embodiment of the invention.

FIG. 23 shows the radiation pattern of the improved array structure. The region of interest is the area where the antenna directivity is high. So for ϕ=0° the region around the broadside and for ϕ=90° the complete half sphere are of interest. FIG. 24 shows an axial ratio for a 15 cell array with φ=0°. FIG. 25 shows the axial ratio for a 15 cell array with φ=90°.

If the rotational condition is met, only the delay loop and the feeding line affect the polarisation. It is argued that the electric field at the circular patch edge is influenced by the transmission line. The feeding line excites the modes and cannot be tuned, but the delay loop is capable of being tuned. The influence is minimum if the outgoing circuit transmission line is rectangular and the transmission line width is thin.

Figure 26:
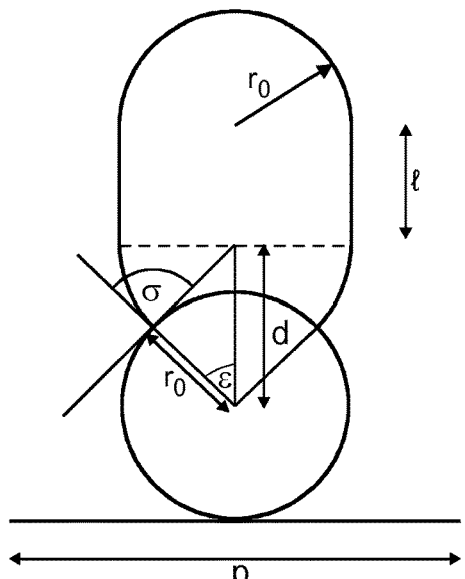
FIG. 26 shows a schematic view of an embodiment of a unit cell.

FIG. 26 shows a schematic view of a unit cell according to an embodiment of the invention.

In order to achieve a rectangular outgoing angle σ under the condition that the upper and lower half circle has the same radius r0 as the patch, the circle centre distance d has to be determined. This approach yields the centre distance between each circle configuration:

$$d = \sqrt{2} r_0 \qquad (4.1)$$

The other tuning parameter is the length l in-between the upper and lower half circle, in order to adapt the electrical length. After full wave simulation the variation yields the following new parameter set (Table 4.2) for the array structure.

TABLE 4.2

Improved Array parameters

| | analytic unit cell calculation | improved Unit Cell | improved Array |
|---|---|---|---|
| $\frac{r_o}{mm}$ | 1.8631 | 1.8 | 1.7 |
| $\frac{l}{mm}$ | 2.2928 | 1.4035 | 1.4548 |
| $\frac{p}{mm}$ | 7.5727 | 7.2361 | 7.5727 |
| $\epsilon$ | 60° | 60° | 45° |
| $\frac{d}{mm}$ | 2.2751 | 2.1981 | 2.4041 |
| $\epsilon_r$ | 3.6 | 3.6 | 3.6 |
| $\frac{w}{mm}$ | 0.3063 | 0.3063 | 0.0363 |
| $\frac{h}{mm}$ | 0.256 | 0.256 | 0.256 |
| $\frac{h_{C_u}}{mm}$ | 0.035 | 0.035 | 0.035 |

Figure 27:
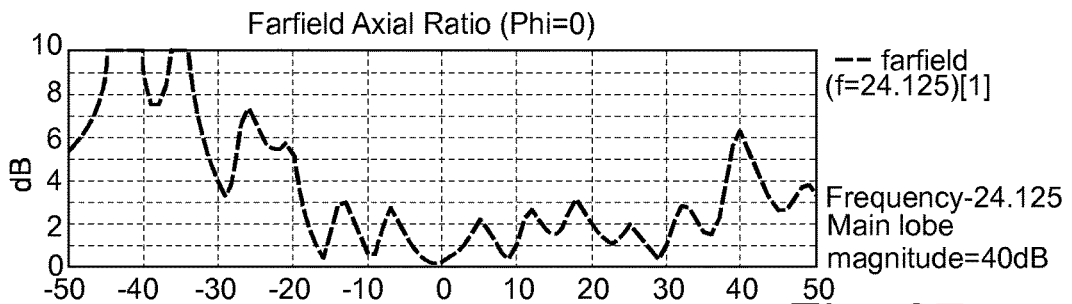
FIG. 27 shows an axial ratio for an improved 15 cell array with φ=0°, according to an embodiment of the invention.
Figure 28:
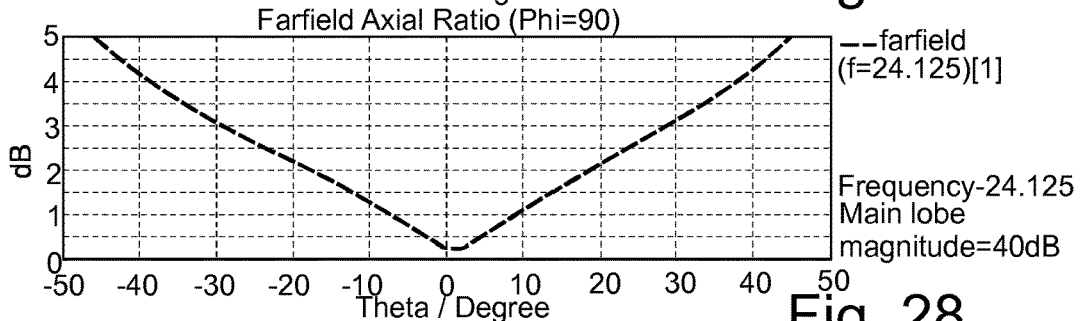
FIG. 28 shows an axial ratio for an improved 15 cell array with φ=90°, according to an embodiment of the invention.

FIGS. 27-28 demonstrate the enhancement of the axial ratio, i.e. with φ=0° and φ=90°, respectively. Near broadside radiation the axial ratio is very close to zero dB.

In embodiments, the reflection coefficient may be optimized, such that the delay loop has a different parameter for each unit cell, as in the middle of the structure higher coupling effects occur than at the ends of the structure.

Figure 29:
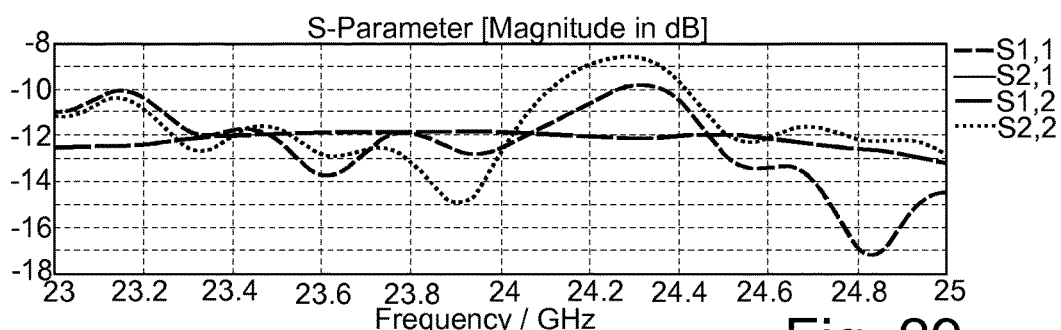
FIG. 29 shows a scattering parameter amplitude for an improved 15 cell array.

FIG. 29 shows scattering parameter amplitude for an improved 15 cell array. The dispersion relation demonstrates the improvement of the above described optimization.

Figure 30:
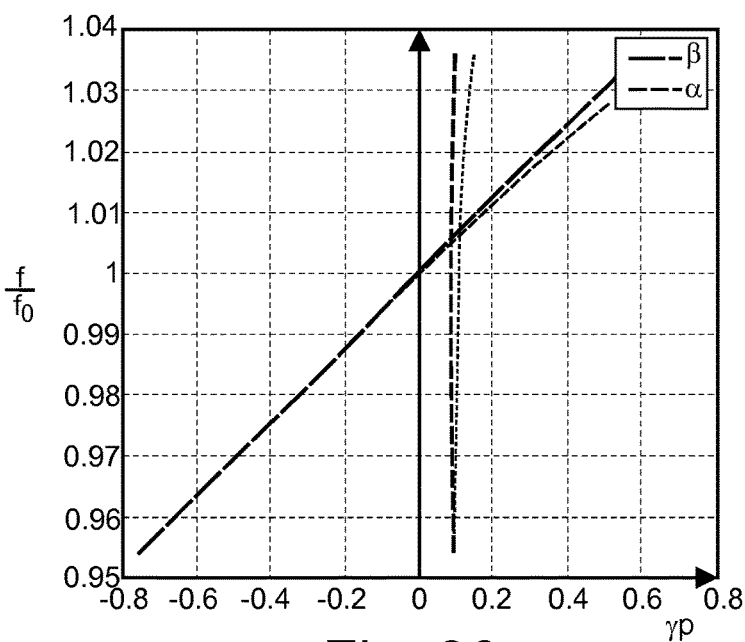
FIG. 30 shows an array dispersion relation—improved (solid line) and not improved (dashed line), according to an embodiment of the invention.

FIG. 30 shows an array dispersion relation—Improved (solid line) and not improved (dashed line).

4.2.2 Farfield and Transmission Line Characteristics

Figure 31:
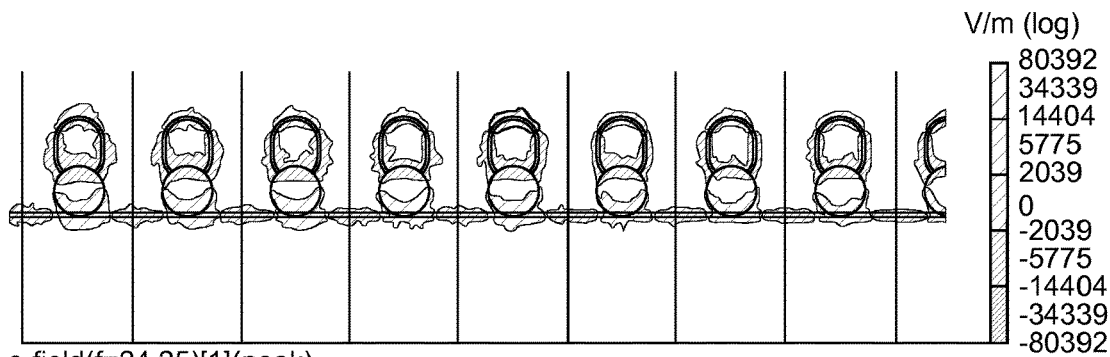
FIG. 31 shows an array electric field distribution in even mode excitation.
Figure 32:
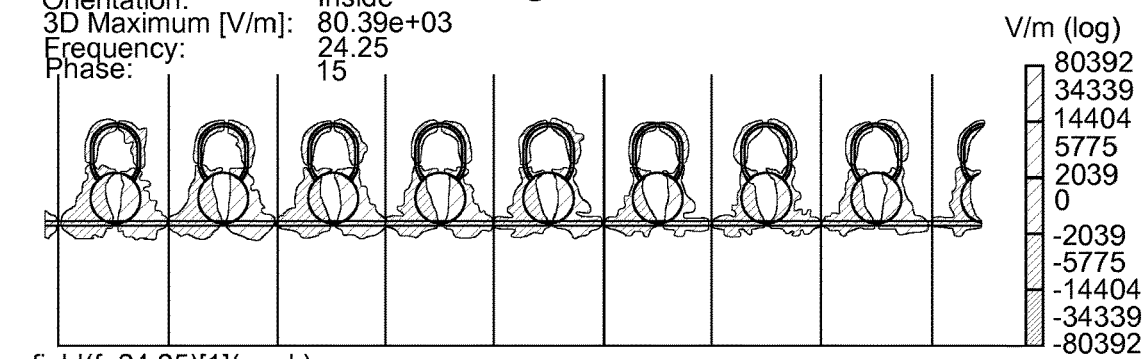
FIG. 32 shows an array electric field distribution in odd mode excitation.

FIGS. 31 to 32 illustrate the electric field distribution for even and odd mode excitation, respectively. The excitation frequency is the centre frequency f0=24.25 GHz. The figures below show that every field distribution is equal to each other and that the unit cells are in phase.

Figure 33:
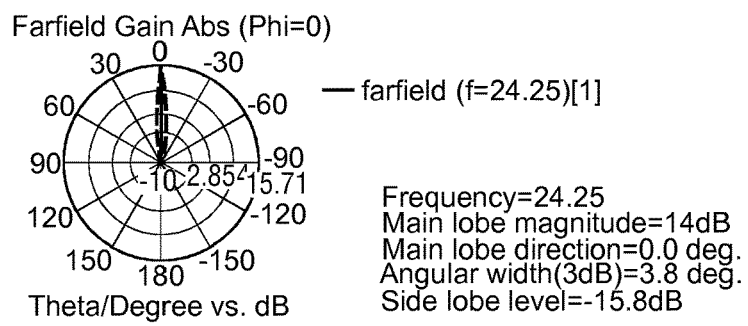
FIG. 33 shows an azimuth radiation pattern for broadside radiation, according to an embodiment of the invention.

In comparison with a phased array configuration, it can be shown that if all cells are in-phase then the far-field's main beam radiates at broadside, as depicted in FIG. 33. Therefore, zero phase shift corresponds to a zero propagation constant, as depicted in the dispersion relation.

Figure 34:
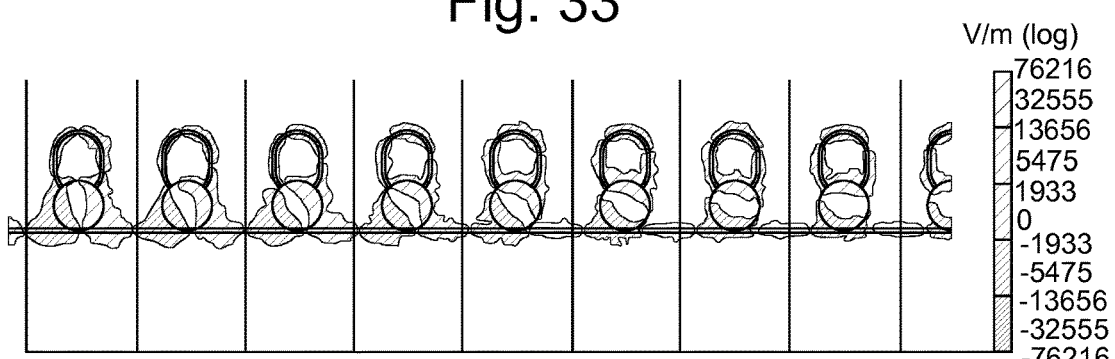
FIG. 34 shows an array field distribution beyond centre frequency, according to an embodiment of the invention.

FIG. 34 shows an array field distribution beyond centre frequency. The variation of centre frequency to 24 GHz yields a phase shift from one unit cell to each other. It is shown in FIG. 34 that the rotation angle is continuously shifted to a mathematical positive direction.

Figure 35:
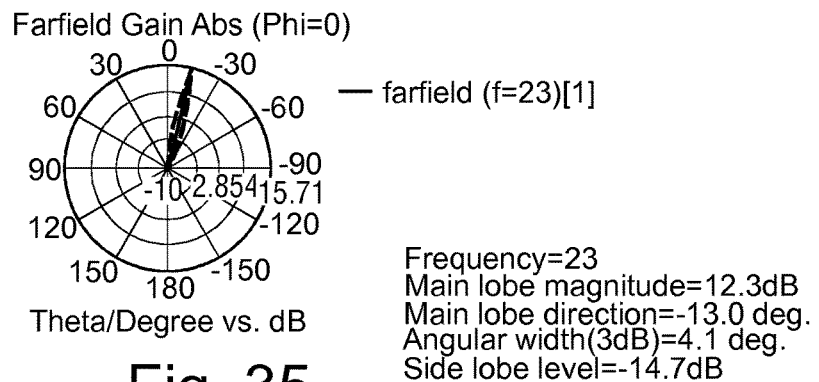
FIG. 35 shows an azimuth radiation pattern for positive endfire radiation, according to an embodiment of the invention.
Figure 36:
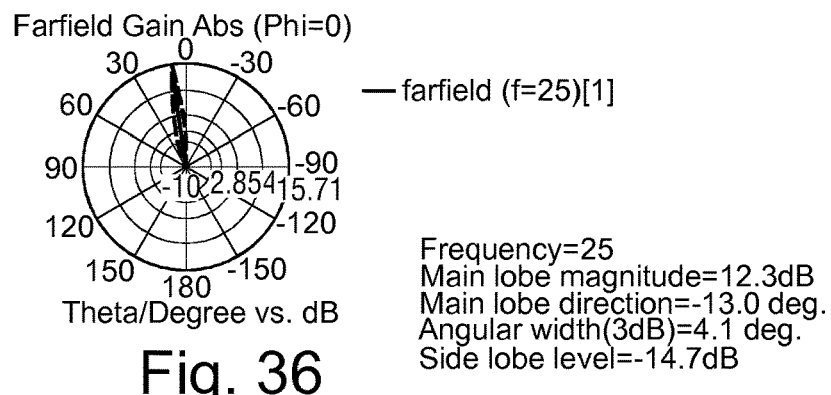
FIG. 36 shows an azimuth radiation pattern for negative endfire radiation, according to an embodiment of the invention.

FIG. 35 shows an azimuth radiation pattern for positive endfire radiation. A mathematical positive shift for instance in coordinate transformation yields to a negative sign in the argument. So the propagation constant becomes a negative value and, based on the phased array theory, the main beam direction becomes positive as depict in FIG. 35. The same argumentation with inverse algebraic signs is valid for the negative endfire radiation, as shown in FIG. 36.

Hence, it is demonstrated by full wave simulation that the consideration of transmission line propagation constant βz yields the beam direction frequency sensitivity. Another aspect is the attenuation constant and the related equivalent magnetic current distribution. The validity of attenuation constant flatness can be shown by azimuth radiation pattern angular beam width. In FIGS. 35, 33 and 35, these are 4.1°, 3.8° and 3.8°, respectively. The beamwidth is approximately constant, as is the attenuation constant. So the measurement of the two port scattering parameter and the extraction of transmission line characteristics and its complex propagation constant, yields the radiation characteristics.

4.3 Measurements

Figure 37:
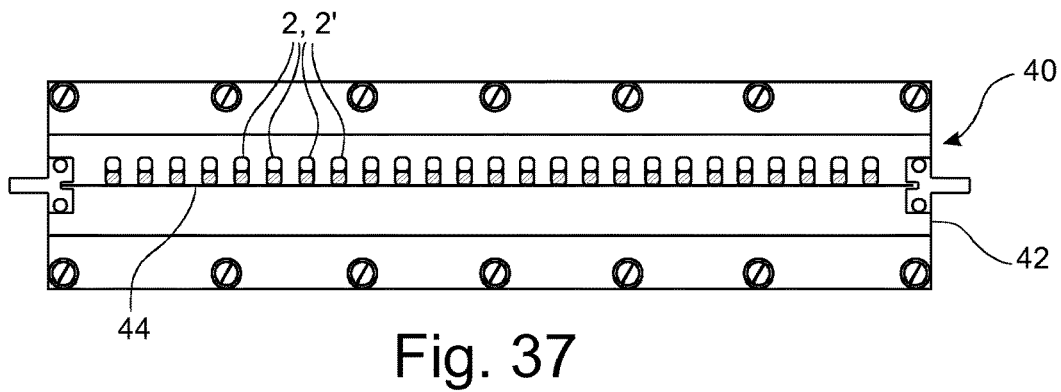
FIG. 37 shows a 25 cell leaky wave antenna, according to an embodiment of the invention.

In this section, the transmission line characteristics of simulated data as well as the measurement data are discussed. The simulated and measured target is depicted in FIG. 37—a 25-cell leaky wave antenna 40. As discussed above, leaky wave antenna 40 is a series fed antenna formed by multiple unit cells 2, 2' formed in copper on substrate 42, with each cell 2, 2' being attached to feed line 44.

The simulation was done by full wave simulation using CST microwave studio. The de-embedding reference plane is similar to the measurement reference plane. The simulation was done by frequency solver using copper as well as lossy substrate. The boundary conditions are selected as open add space (perfectly matched layer including air space).

Figure 38:
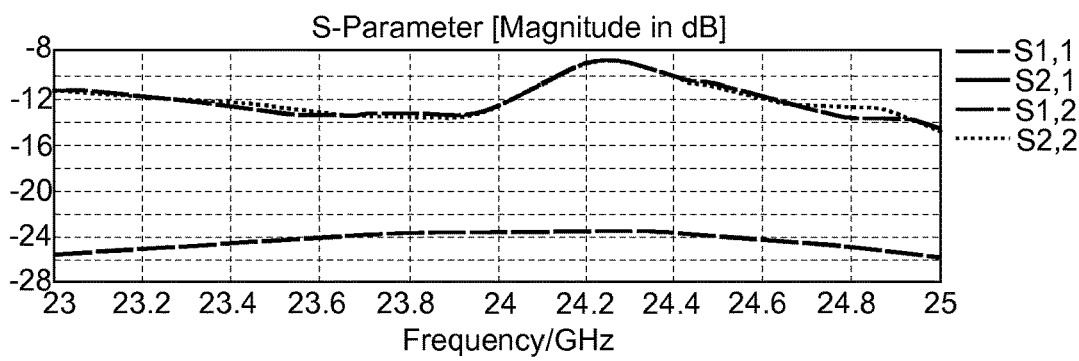
FIG. 38 shows the scattering parameter amplitude for a 25 cell simulated Array under real conditions, according to an embodiment of the invention.

FIG. 38 shows the scattering parameter amplitude for a 25-cell simulated array under real conditions.

Figure 39:
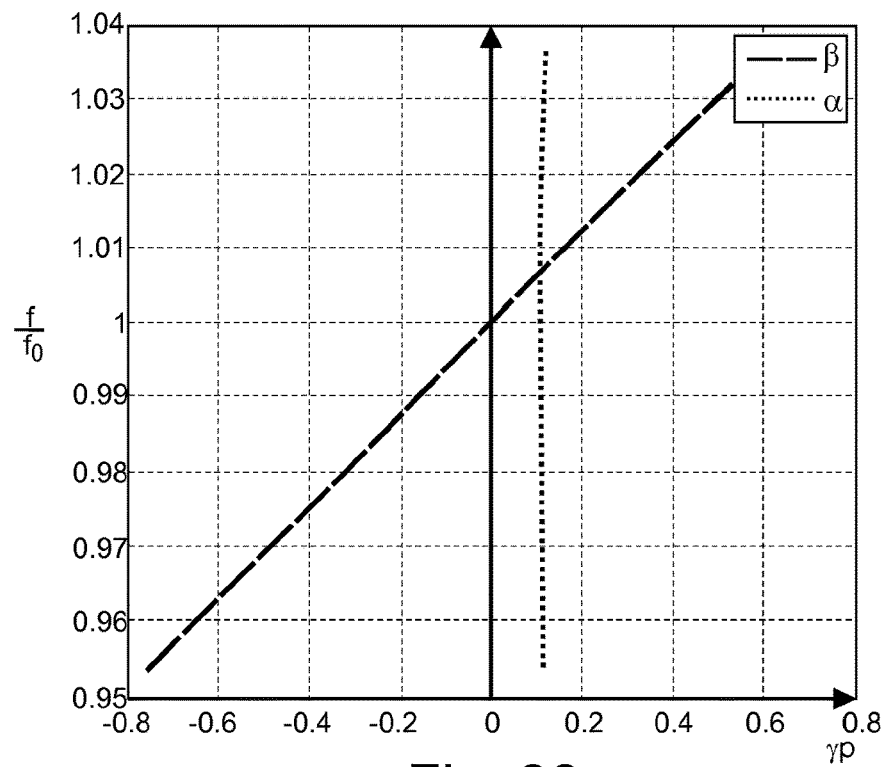
FIG. 39 shows a dispersion relation of a 25 cell simulated array under real conditions, according to an embodiment of the invention.

FIG. 39 shows the dispersion relation for a 25-cell simulated array under real conditions. The transmission parameter demonstrates a homogeneous and approximately flat attenuation constant, as depicted in FIG. 39. The reflection parameter is also flat except for one peak near f=24.25 GHz. The resonant frequency within the circular patch is similar to the frequency where the reflection peak appears. So this peak corresponds to a mutual coupling effect which excites the n=1 spatial harmonic mode.

The peak is not as high and no open stopband effect appears, as seen in FIG. 39. The simulated dispersion relation shows approximately perfect transmission line characteristics in the given frequency band.

The measurement shows that the reflection coefficient is smaller than the simulation. The enhancement of reflection at the resonant patch frequency is less shaped than the simulation. This lower reflection indicates less coupling effects with respect to the simulation because the n=1 mode is less excited.

Figure 40:
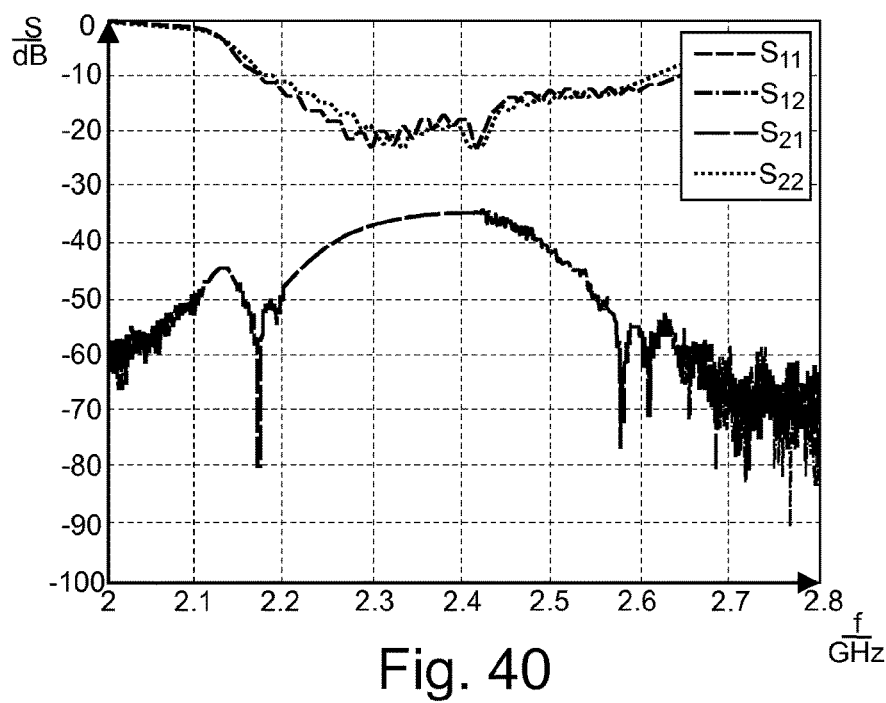
FIG. 40 shows a measured scattering parameter amplitude of a circular patch leaky wave antenna, according to an embodiment of the invention.

FIG. 40 shows a measured scattering parameter amplitude for a circular patch leaky wave antenna in accordance with an embodiment of the invention.

Measurement faults with respect to less coupling may be due to the measurement environment, as well as a faulty de-embedding mechanism.

Figure 41:
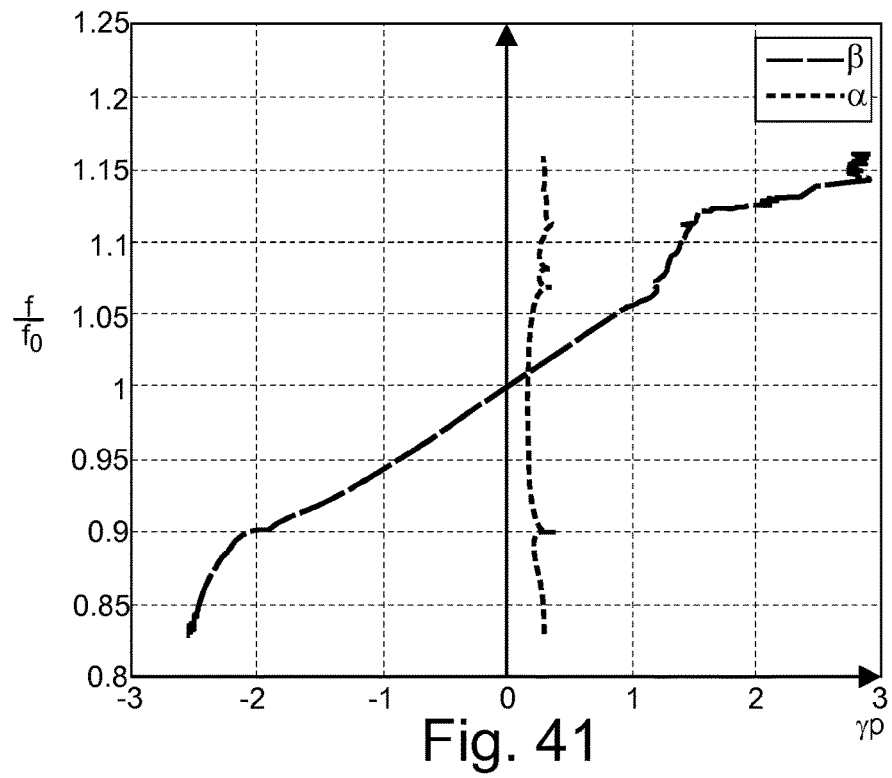
FIG. 41 shows a measured dispersion relation of a circular patch leaky wave antenna, according to an embodiment of the invention.

FIG. 41 shows a measured dispersion relation for a circular patch leaky wave antenna. In the measured dispersion relation, as well as in the reflection plot, it is evident that there is a broad frequency range in which the leaky wave antenna is workable. The frequency range is from 22 GHz to 25.5 GHz within a relative bandwidth of about 15%. The following table uses the formulation of Section 2 hereinabove for the 3 dB beam width and for the main lobe direction based on the measured data.

TABLE 4.3

| | | Calculated radiation characteristic | | | |
|---|---|---|---|---|---|
| $\dfrac{f}{\text{GHz}}$ | $\dfrac{f}{f_0}$ | αp | βp | Δφ̄ | φ$_m$ |
| 22 | 0.9122 | 0.2289 | −1.6675 | 8.22° | −27.57° |
| 23 | 0.9534 | 0.1715 | −0.7951 | 5.83° | −11.76° |
| 24 | 0.99 | 0.1588 | −0.0386 | 5.49° | −0.58° |
| 24.125 | 1 | 0.1612 | 0.0512 | 5.63° | −0.77° |
| 24.25 | 1.01 | 0.161 | 0.1406 | 6.19° | 1.91° |
| 25 | 1.0363 | 0.1931 | 0.6688 | 7.09° | 9.70° |
| 25.5 | 0.1057 | 0.2304 | 1.0703 | 8.82° | 15.33° |

The broadside radiation has a minor angle offset of 0.770. And the beam width has a little degradation at the maximum, as well as at the minimum, radiation angle. It is to be noted that the equations in the above section 2 are approximate and may only be valid for broadside radiation. The calculated parameters in Table 4.3 may be verified by radiation pattern measurements.

5. Summary and Further Embodiments

As mentioned hereinabove, in embodiments, two leaky wave antennas are disclosed with a steering beam range from −45° to 45° and from −5° to 5°, respectively. The performance of the leaky wave antenna may have capability of steering a beam from approximately −1° to 2° in the given frequency range.

Figure 42:
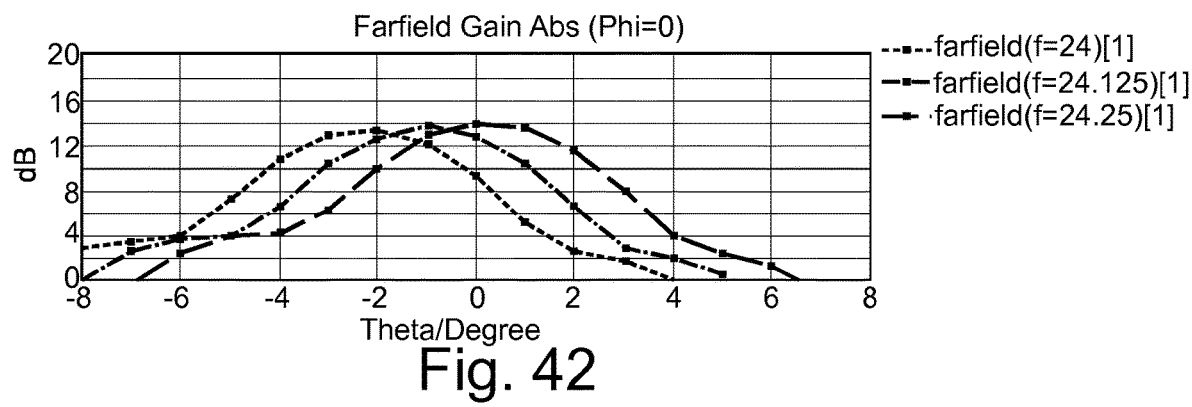
FIG. 42 shows the beam steering capability within the 24 GHz ISM band, according to an embodiment of the invention.

FIG. 42 shows the beam steering capability within the 24 GHz ISM Band.

Regarding the linearisation of the dispersion relation, three parameters affect the beam sensitivity—the attenuation or radiation per unit cell $\sqrt{R_s G_p}$, the unit cell quality factor Q and the unit cell period length p.

$$\beta_z = 2Q \frac{\sqrt{R_s G_p}}{p} \frac{\Delta\omega}{\omega_0} \quad (5.1)$$

where the factor $$\frac{\Delta\omega}{\omega_0}$$

gives a relation for the relative bandwidth which is a criterion determining which integrated circuit is to be used.

Figure 44:
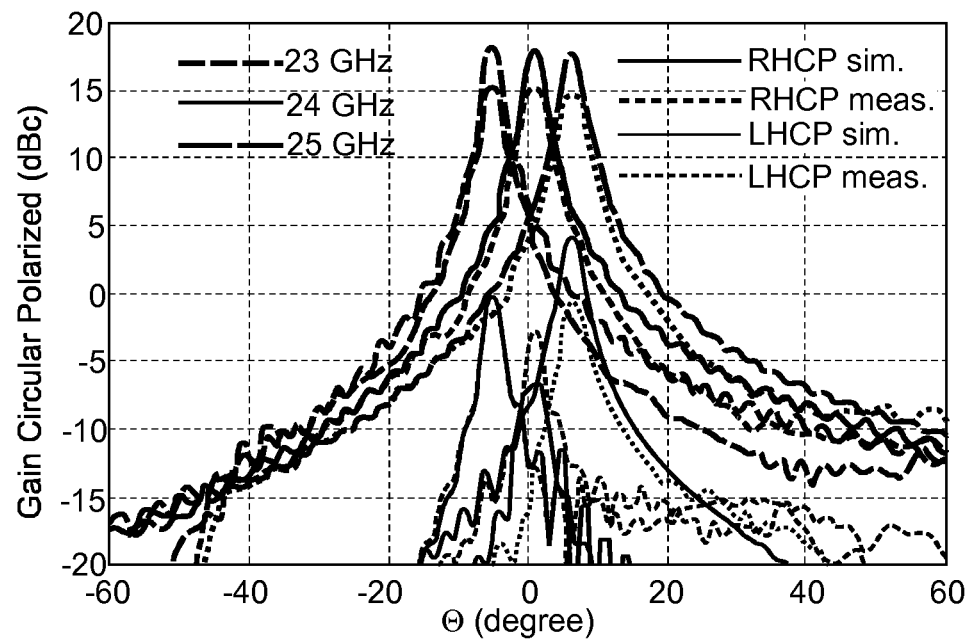
FIG. 44 shows the beam steering capability within the frequency range 23 GHz to 25 GHz of the design of [8]

In embodiments, the quality factor of the antenna is optimized. The consideration of the frequency range from 23 GHz to 25 GHz and the comparison with a series fed patch antenna azimuth radiation pattern of FIG. 44 illustrates that the presented design has a more sensitive beam. By factoring in the following relationship as well as the usage of equation 5.1 and the findings of this paper [12], both antennas can be compared.

$$\sin(\phi_m) = \frac{\beta_z p}{\beta_0 p} \quad (5.2)$$

TABLE 5.1

| | Parameter comparison | | |
|---|---|---|---|
| | present work | [12] | [6] |
| $\dfrac{p}{\text{mm}}$ | 7.5727 | 6.625 | 4.0 |
| Q | 128 | 75 | — |
| $\dfrac{h}{\text{mm}}$ | 0.256 | 0.5 | 0.675 |
| $\epsilon_r$ | 3.6 | 3.6 | 10.2 |

Figure 43:
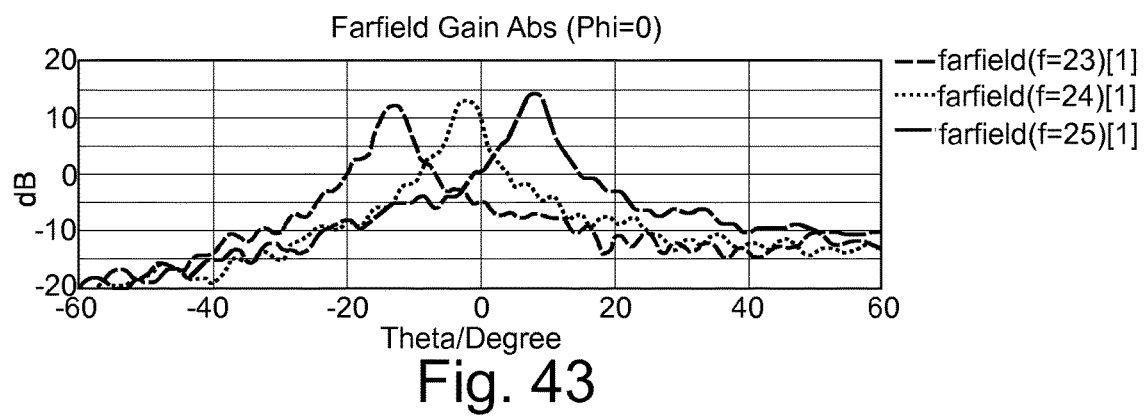
FIG. 43 shows the beam steering capability within the frequency range 23 GHz to 25 GHz, according to an embodiment of the invention.

In Table 5.1 above, the characteristic parameters for a frequency sensitive beam are given. The Q-factor is the only improved parameter. FIGS. 43 and 44 show that the quality factor affects the sweep sensitivity strongly: the former shows beam steering capability within the frequency range 23 GHz to 25 GHz the above embodiment of the present invention, and the latter shows beam steering capability within the frequency range 23 GHz to 25 GHz for a known antenna design [8].

The authors of [12] use the substrate with another height. So the structure according to embodiments of the present invention has a very good performance in relation to Q-factor. With the following sensitivity definition s, another series fed patch antenna may be compared with the series circular patch leaky wave antenna.

$$\begin{aligned} s &= \frac{\partial}{\partial \omega_n} \beta_z \\ &= 2\frac{Q a_z}{p} \\ &= \frac{p}{c_0} \frac{\omega_2 \sin(\phi_{m2}) - \omega_2 \sin(\phi_{m1})}{\omega_2 - \omega_1} \\ &= \frac{p}{c_0} \frac{f_2 \sin(\phi_{m2}) - f_2 \sin(\phi_{m1})}{f_2 - f_1} \end{aligned} \quad (5.3)$$

The assessment of series fed patch leaky wave antenna yields a period length p which is even the effective wavelength of substrate.

$$p = \lambda_{\text{eff}} = \frac{c_0}{\sqrt{\epsilon_{\text{reff}}}\, f_0} \quad (5.4)$$

In [6] a relative permittivity $\epsilon_r$=10.2 is used. In order to achieve an equivalent formulation, the sensitivity expression is normalized to the period length and multiplication with the speed of light.

$$\tilde{s} = \frac{f_2 \sin(\phi_{m2}) - f_2 \sin(\phi_{m1})}{f_2 - f_1} \quad (5.5)$$

TABLE 5.2

| Sensitivity comparison | | | |
|---|---|---|---|
| | present work | [12] | [6] |
| $\tilde{s}$ | 4.45 | 2.09 | 4.46 |

Figure 45:
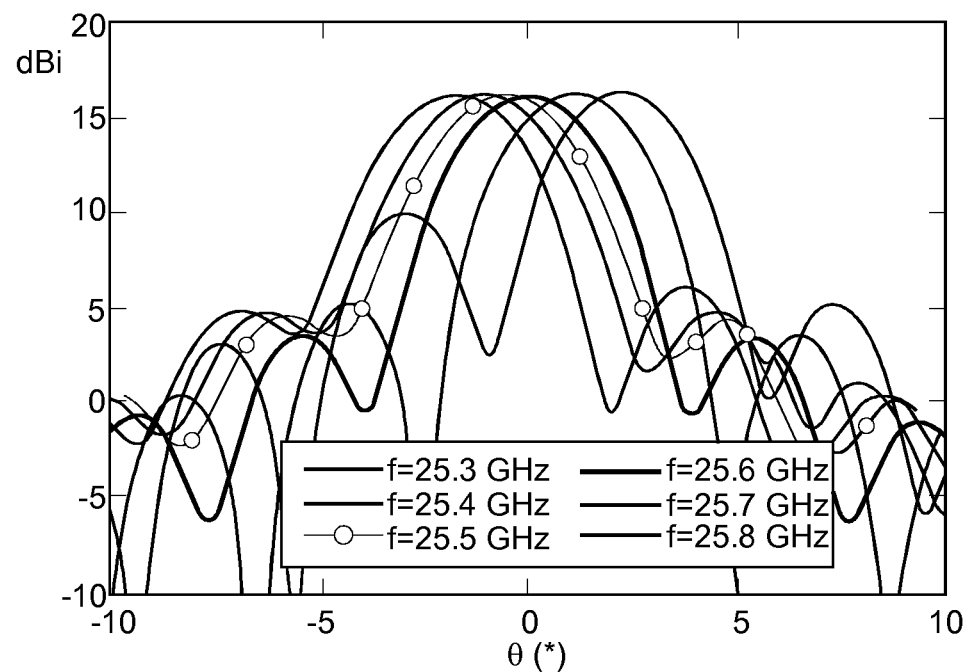
FIG. 45 shows radiation pattern of the design of [6]
Figure 46:
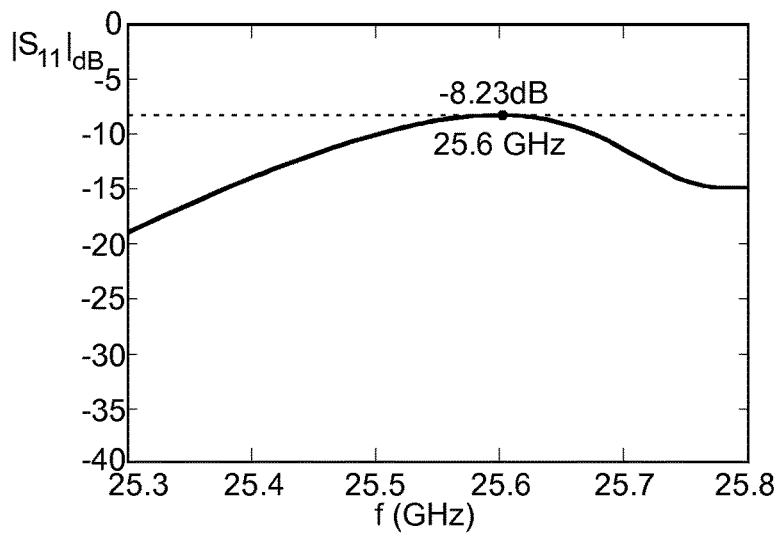
FIG. 46 shows reflection coefficient of the design of [6]

FIG. 45 shows the radiation pattern of the design of [6] and FIG. 46 shows the reflection coefficient within the frequency.

The normalized beam sensitivity $\tilde{s}$ of [6] is near the normalized sensitivity according to embodiments described herein. Regarding the reflection characteristic, the embodiments described herein have a lower reflection peak.

The design according to embodiments described herein is very effective in Q-factor optimization. It is also shown that the period length can be improved by choosing a higher relative permittivity with respect to [6]. The improvement based on choosing another material can be expressed by:

$$\frac{p_1}{p_2} = \sqrt{\frac{\epsilon_{r2}}{\epsilon_{r1}}} \approx 1.68 \quad (5.6)$$

Only the material enables a period improvement of 68%. Furthermore, the Q-factor is influenced by $\epsilon_r$. The height of the substrate is also a parameter which may have effects. The simplified expression for the propagation constant affords that the sensitivity can be improved by choosing a higher frequency. Using the 79 GHz band improves the effective wavelength by 329%. With a relative bandwidth of 5%, it is may be possible with the same structure to achieve an all over 110° beam steering. Considering interior automotive applications, the person to be detected would have to be within the antenna far field. So the antenna must be small and a length reduction when using a 79 GHz approach, or meta material technique, is necessary.

In embodiments described herein, an effective design with a low number of parameters is presented. The low number of parameters makes it easy to optimize the structure. Furthermore, the structure has good transmission line characteristics over a broad frequency range.

The present invention finds industrial application is systems such as automobile rear bench seatbelt reminders and child hyperthermia sensors.

While embodiments have been described by reference to embodiments having various components in their respective implementations, it will be appreciated that other embodiments make use of other combinations and permutations of these and other components.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit and scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

ANNEX A

Nomenclature $\vec{A}$ arbitrary field vector, equation (2.1), page (3)
$\alpha_i$ attenuation constant in i-direction, equation (2.4), page (4)
$\beta_i$ propagation constant imaginary part in i-direction, equation (2.4), page (4)
$\Delta$ laplacian operator, equation (2.1), page (3)
$\lambda_{eff}$ effective substrate wavelength
$\omega_0$ centre frequency for broadside radiation
$\omega_p$ parallel admittance resonant frequency
$\omega_s$ series impedance resonant frequency
$\vec{E}_p$ periodic electric field distribution within each unit cell
$\xi_{ij}$ j-th maximum of i-th order function
$C_p$ parallel capacitance equivalent transmission line model
$C_s$ series capacitance equivalent transmission line model
D Directivity
d circle to circle centre
$E_{x_p}$ electric field distribution for the parallel or odd mode
$E_{x_s}$ electric field distribution for the series or even mode
$G_p$ parallel conductance equivalent transmission line
$G_{rad}$ radiation admittance
h height of substrate
$h_{C_u}$ height of copper
$k_0$ free space propagation constant, equation (2.1), page (3)
$k_i$ propagation constant in i-direction, equation (2.2), page (4)
$k_{z0}$ zero th spatial harmonic in z-direction
l delay loop tuning length
$L_p$ parallel inductance equivalent transmission line model
$L_s$ series inductance equivalent transmission line model
n nth spatial harmonic
p Unit Cell period length
$Q_p$ parallel quality factor
$Q_s$ series quality factor
$r_0$ effective patch radius
$r_g$ geometrical radius
$R_s$ series resistance equivalent transmission line model
$\omega$ delay loop and feeding line width $Y_p$ equivalent transmission line parallel complex admittance
$Y_{pl}$ linear equivalent transmission line model parallel complex admittance
$Z_B$ Bloch impedance
$Z_s$ equivalent transmission line model series complex impedance
$Z_{sl}$ linear equivalent transmission line model series complex impedance

ANNEX B

Bibliography

[1] Paolo Baccarelli. *One-Dimensional Periodic Leaky-Wave antennas*. La Spienza University of Rome.
[2] Klaus Solbach Simon Otto, Andreas Rennings and Christophe Caloz. *Transmission Line Modeling and Asymptotic Formulas for Periodic Leaky-Wave Antennas Scanning Through Broadside*. IEEE TRANSACTIONS ON ANTENNAS AND PROPAGATION,
[3] Guido Valerio, *Bloch-wave analysis for 1-D periodic printed struc-tures*. La Spienza University of Rome,
[4] Otfried Georg. *Elektromagnetische Wellen*. Springer, 1997,
[5] Fabrizio Frezza Simone Paulotto, Paolo Baccarelli and David R. Jackson. *Full-Wave Modal Dispersion Analysis and Broadside Op-timization for a Class d Microstrip CRLH Leaky-Wave Antennas*. IEEE TRANSACTIONS ON MICROWAVE THEORY AND TECHNIQUES. 2008.
[6] Fabrizio Frezza Simone Paulotto, Paolo Baccarelli and David R. Jackson. *A Novel Technique for Open-Stopband Suppression in 1-D Periodic Printed Leaky-Wave Antennas*. IEEE TRANSACTIONS, ON ANTENNAS AND PROPAGATION, 2009,
[7] Prof, Dr.-Ing. Wiesbeck. Antennen und Antennensysteme. 2005, Universität Karlsruhe (TH) Institut für Höchstfrequenztech-nik und Elektronik.
[8] Zhichao Chen Andreas Rennings Klaus Solbach Simon Otto, Amar Al-Bassam and Christophe Caloz. *Q-Balancing in Periodic Leaky-Wave Antennas to mitigate Broadside Radiation Issues*. Department HFT ATE, University of Duisburg-Essen. Bismarckstr, 81, 47057 Duisburg. Germany Ecole Polytechnique d Montreal, 2500, ch. de Polytechnique, PUT 1.4, Montreal, Quebec, Canada,
[9] A. Anghel and R. Cacoveanu. IMPROVED COMPOSITE RIGHT/LEFT-HANDED CELL FOR LEAKY-WAVE ANTENNA. Progress In Electromagnetics Research Letters, 2011. Faculty of Electronics, Telecommunications and Information Technology University POLITEHNICA of Bucharest 1-3 Iuliu Maniu, Bucharest 061071. Romania,
[10] Constantine A, Balanis. *Antenna Theory Analysis and Design*. Wiley-Interscience.
[11] T, Liebig C. Caloz K. Solbach S. Otto, A. Rennings, *An Energy-Based Circuit Parameter Extraction Method F CRLH Leaky Wave Antennas*. Hochfrequenztechnik (HFT) and Allgemeine and Theoretische Elektrotechnik (ATE) University of Duisburg-Essen. ?cole Polytechnique de Montreal, ch. de Polytechnique, H3T 1J4, Quebec, Canada.
[12] Amar Al-Bassam Andreas Rennings Klaus Solbach Simon Otto, Zhichao Chen and Christophe Caloz, *Circular Polarization of Pe-riocke Leaky-Wave Antennas With Axial Asymmetry: Theoretical Proof and Experimental Demonstration*. IEEE TRANSACTIONS ON ANTENNAS AND PROPAGATION.

The invention claimed is:

1. An antenna element comprising a cell of filled circular geometry adapted to operate, when driven in use, in the E01 mode, and a delay loop configured for mode rotation, wherein the delay loop is adapted to achieve O-balancing, mutual coupling compensation and/or tuning of a reflection coefficient within the delay loop length.

2. The antenna element of claim 1, further including a stub configuration adapted to achieve a matched network using a mode rotation condition, wherein said cell is coupled to a feed line at a first point on a perimeter of the cell such that the feed line extends tangentially to the cell.

3. The antenna element of claim 2, wherein the cell is configured to be coupled to a feed line at a first point on a perimeter of the cell, and the delay loop is attached to a side of the cell at points on the perimeter substantially opposite to the side containing the first point.

4. The antenna element of claim 3, wherein a y-direction is defined by or parallel to a line joining the center of the cell with said first point, and a line through said center and perpendicular to the plane of the cell defines an x-direction; and wherein the delay loop is symmetrical in the x-y plane.

5. The antenna element of claim 4, wherein a z-direction is defined through said center and perpendicular to the x-y plane.

6. The antenna element of claim 5, the antenna element being in a form allowing the first spatial mode in z-direction to radiate.

7. The antenna element of claim 1, comprising a passive spatial mode filter.

8. The antenna element of claim 7, wherein the passive spatial mode filter comprises the delay loop with integrated delay lines.

9. The antenna element of claim 7, wherein the passive spatial mode filter comprises an upper half circle and a lower half circle, with a respective delay line coupling each pair of opposing ends of the upper half circle and a lower half circle.

10. The antenna element of claim 9, wherein the separation d between the centers of the lower half circle and the cell is given by $$d = \sqrt{2} r_0,$$

where $r_0$ is the radius of the upper half circle and/or the lower half circle and/or the cell.

11. A leaky wave antenna comprising a plurality of antenna elements according to claim 1.

12. The leaky wave antenna of claim 11, wherein the antenna elements are connected to each other in a linear array, so as to form a series fed patch antenna.

13. The leaky wave antenna of claim 11, wherein the antenna elements are in periodic form.

14. The leaky wave antenna of claim 11, wherein the antenna elements are connected to a feed line.

15. The leaky wave antenna of claim 14, comprising a passive spatial mode filter that includes a filter loop attached at points on a side of the cell opposite to a point of connection of the cell to the feed line.

16. The leaky wave antenna of claim 11, manufactured using microstrip technology on a printed circuit board (PCB).

17. A unit cell comprising a cell, a delay loop and a feed line portion, the feed line portion being an element of the feed line, wherein the cell has a filled circular geometry adapted to operate, when driven in use, in the E01 mode, and the delay loop configured for mode rotation, wherein the delay loop is adapted to achieve Q-balancing, mutual coupling compensation and/or tuning of a reflection coefficient within a delay loop length.

18. The unit cell of claim 17, wherein the unit cell includes the following parameters wherein $r_0$ is an effective patch radius, l is a delay loop tuning length, $\rho$ is a unit cell period length, $\epsilon$ is an angle within the circular geometry, d is a circle to circle centre distance, $\epsilon_r$ is the relative permittivity, $\omega$ is a delay loop and feeding line width, h is a height of the substrate, $h_{cu}$ is a height of copper:

| | |
|---|---|
| $\dfrac{r_o}{mm}$ | 1.8 |
| $\dfrac{l}{mm}$ | 1.4035 |
| $\dfrac{p}{mm}$ | 7.2361 |
| $\epsilon$ | 60° |
| $\dfrac{d}{mm}$ | 2.1981 |
| $\epsilon_r$ | 3.6 |
| $\dfrac{w}{mm}$ | 0.3063 |
| $\dfrac{h}{mm}$ | 0.256 |
| $\dfrac{h_{C_u}}{mm}$ | 0.035. |

19. A leaky wave antenna comprising a plurality of unit cells according to claim 17.

20. The leaky wave antenna of claim 19, wherein the phase shift within each unit cell is $2\pi n$ where n is an integer, or wherein the unit cells form an array having the following parameters wherein $r_0$ is an effective patch radius, l is a delay loop tuning length, $\rho$ is unit cell period length, $\epsilon$ is an angle within the circular geometry, d is a circle to circle centre distance, $\epsilon_r$ is the relative permittivity, $\omega$ is a delay loop and feeding line width, h is a height of the substrate, $h_{cu}$ is a height of copper:

| | |
|---|---|
| $\dfrac{r_o}{mm}$ | 1.7 |
| $\dfrac{l}{mm}$ | 1.4548 |
| $\dfrac{p}{mm}$ | 7.5727 |
| $\epsilon$ | 45° |
| $\dfrac{d}{mm}$ | 2.4041 |
| $\epsilon_r$ | 3.6 |
| $\dfrac{w}{mm}$ | 0.3063 |
| $\dfrac{h}{mm}$ | 0.256 |
| $\dfrac{h_{C_u}}{mm}$ | 0.035. |

21. A radar sensor system for sensing occupancy status within an automotive vehicle, the system comprising:
an antenna system, for illuminating at least one occupiable position within the vehicle with continuous wave (CW signals), the CW signals being frequency modulated in time, the antenna system comprising a leaky wave antenna according to claim 11;
at least one sensor for receiving at least one sensor signal reflected as a result of the CW signals, processing circuitry, coupled to the at least one sensor, the processing circuitry being operable for applying, occupancy detection algorithms to the at least one sensor signal to generate a modified signal; and
generating, based on the modified signals, one or more occupancy status signals, the occupancy status signal indicating a property related to said at least one occupiable position.

22. The radar sensor system according to claim 21, wherein the antenna system is adapted to illuminate with a steerable beam from −45° to 45° in the 24 GHz ISM Band.

23. The radar sensor system according to claim 21, wherein the antenna system is adapted to illuminate with a steerable beam from −5° to 5° in the 24 GHz ISM Band.

* * * * *